US005216448A

United States Patent [19]

Unosawa et al.

[11] Patent Number: 5,216,448

[45] Date of Patent: Jun. 1, 1993

[54] INK JET RECORDING HEAD CARRIAGE AND AN APPARATUS WITH SAME

[75] Inventors: Yasuhiro Unosawa, Tokyo; Tetsuo Kimura, Sagamihara; Kou Hasegawa, Yokohama; Masasumi Nagashima, Tokyo; Keiji Nagira, Kawasaki; Hiroshi Sugitani, Machida; Yoshifumi Hattori, Yamato; Masami Ikeda, Tokyo; Asao Saito, Yokohama; Kazuaki Masuda; Akio Saito, Hadano; Tsuyoshi Orikasa, Kasukabe, all of Japan

[73] Assignee: Canon Kabushiki Kaisha, Tokyo, Japan

[21] Appl. No.: 908,886

[22] Filed: Jul. 7, 1992

Related U.S. Application Data

[63] Continuation of Ser. No. 583,587, Sep. 17, 1990, abandoned.

[30] Foreign Application Priority Data

| | | | |
|---|---|---|---|
| Sep. 18, 1989 | [JP] | Japan | 1-241080 |
| Sep. 18, 1989 | [JP] | Japan | 1-241081 |
| Sep. 18, 1989 | [JP] | Japan | 1-241082 |
| Sep. 18, 1989 | [JP] | Japan | 1-241083 |

[51] Int. Cl.[5] .......... G01D 15/16
[52] U.S. Cl. .......... 346/140 R
[58] Field of Search .......... 346/140 R, 139 R, 75; 400/126

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,577,200 | 3/1986 | Rix et al. | 346/140 R |
| 4,600,927 | 7/1986 | Sugitani | 346/1.1 |
| 4,689,642 | 8/1987 | Sugitani | 346/140 R |
| 4,709,247 | 11/1987 | Piatt et al. | 346/140 R |
| 4,723,129 | 2/1988 | Endo et al. | 346/1.1 |
| 4,740,796 | 4/1988 | Endo et al. | 346/1.1 |
| 4,755,836 | 7/1988 | Ta et al. | 346/140 R |
| 4,872,026 | 10/1989 | Rasmussen et al. | 346/140 R |

FOREIGN PATENT DOCUMENTS

| | | |
|---|---|---|
| 0143250 | 6/1985 | European Pat. Off. . |
| 0313205 | 4/1989 | European Pat. Off. . |
| 3808648 | 4/1989 | Fed. Rep. of Germany . |
| 54-56847 | 5/1979 | Japan . |
| 59-123670 | 7/1984 | Japan . |
| 59-138461 | 8/1984 | Japan . |
| 60-71260 | 4/1985 | Japan . |
| 1-8076 | 2/1989 | Japan . |

*Primary Examiner*—Benjamin R. Fuller
*Assistant Examiner*—N. Le
*Attorney, Agent, or Firm*—Fitzpatrick, Cella, Harper & Scinto

[57] ABSTRACT

A carriage, movable along a predetermined path, for detachably mounting thereon an ink jet recording head includes an abutment portion for positioning the recording head in a horizontal direction; an engageable member, disposed at a side of the carriage facing in a movement direction thereof, for engaging with the recording head, the engageable member is rotatable and translatable; and an operating lever, disposed at a side of the carriage facing in the movement direction, for translating and rotating the engageable member to abut the recording head to the abutment portion, and for rotating the recording head about the abutment portion; a second abutment portion for abutment with the rotating recording head to stop it in one rotational direction; and an urging member for urging the recording head to the second abutment portion, wherein the recording head is mounted on and dismounted from the carrier by moving the operating lever in one direction and by moving it in the opposite direction, respectively.

14 Claims, 30 Drawing Sheets

FIG. 18A
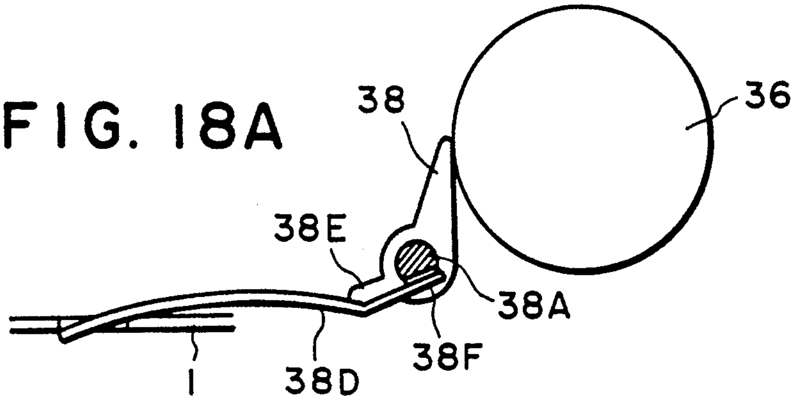
FIG. 18B
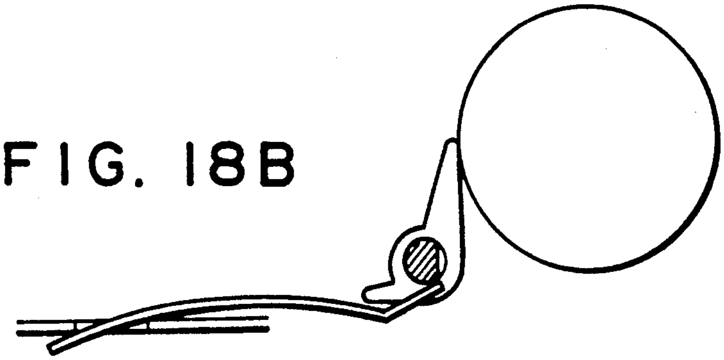
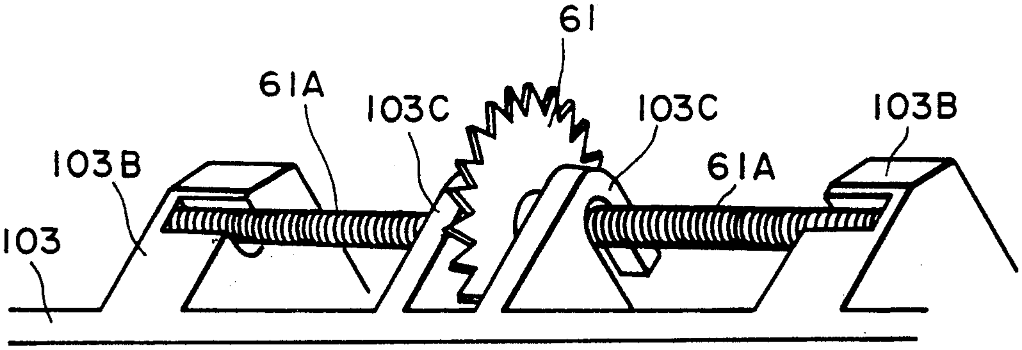
FIG. 19
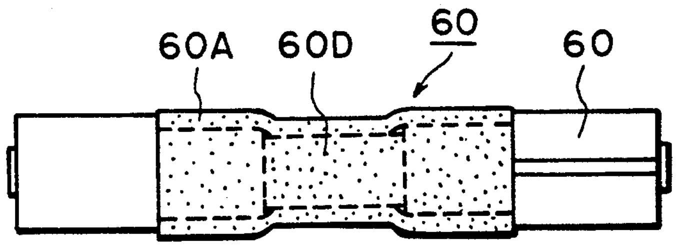
FIG. 20

INK JET RECORDING HEAD CARRIAGE AND AN APPARATUS WITH SAME

This application is a continuation of application Ser. No. 07/583,587 filed Sep. 17, 1990, now abandoned.

FIELD OF THE INVENTION AND RELATED ART

The present invention relates to an ink jet recording head for ejecting recording liquid (ink) to effect recording and a carriage for carrying the recording head and also to an ink jet recording apparatus having the carriage. More particularly, the present invention relates to a structure for detachably mounting on the carriage an ink jet recording head having an integral ink container for containing the ink.

An ink jet recording head, which will hereinafter be called recording head, in an ink jet recording apparatus is known which includes as a unit an ink container and an ink jet recording head element for ejecting the ink.

When the recording head is mounted on the carrier (carriage) of the recording apparatus, the recording head is required to be fixedly mounted at the correct position in order to effect the recording operation by depositing the ink onto the recording medium at a correct position and in order to correctly connect the contacts for the transmission of the recording signals.

The recording head mounting methods include translating or rotating the recording head from above or behind the carrier, and inserting the recording head into the carrier in a predetermined direction followed by operating a fixing lever to press and fix it at the correct position. Japanese Patent Application No. 8076/1989 discloses one mounting method, in which a positioning projection or the like for the correct mounting is outside the entire length of the body of the recording head, and a mounting lever of the carrier is disposed behind the mounted recording head.

Recently, the ink jet recording apparatus, inter alia, the recording head is manufactured through a thin film process or microprocessing technique as used in manufacturing semiconductor chips, so that a smaller size and lower cost recording head is going to be manufactured. With this development, a disposable type recording head having an ink container as a unit is proposed.

To meet the demand, the structure for detachably mounting the recording head on the carrier needs to be improved.

For example, in the structure described above, the guiding member and the positioning projection results in an increase of the length of the recording head, and the mounting lever of the carrier which is disposed behind the recording head requires a large dead space only to allow movement thereof.

In addition, the movable range of the recording head is desirably short so as not to interfere with other parts.

From the standpoint of the capacity of the ink container, it is desirably as large as possible, and the volume of the ink container is preferably as large as possible within the space allotted to the recording head and the carrier. Furthermore, the structure for establishing electric connection between contacts for the transmission of the electric signals such as recording signal, when the mounting and demounting action of the recording head is considered.

SUMMARY OF THE INVENTION

Accordingly, it is an object of the present invention to provide a carrier capable of allowing the widths of the carrier and the recording head in the direction perpendicular to the movement direction of the carrier to be used efficiently for the ink container, and wherein the movable range of the recording head for the mounting and dismounting operation can be minimized. In an embodiment of the present invention, an operating mechanism or the like for the mounting and dismounting of the recording head is disposed at a side facing the carrier movement direction, and the mounting and dismounting operation is performed by translational and rotational movement in a horizontal plane on the carrier.

It is another object of the present invention to provide an ink jet recording head detachably mountable on such a carrier.

According to this aspect of the present invention, there is provided a carriage, movable along a predetermined path, for detachably mounting thereon an ink jet recording head, comprising: an abutment portion for positioning the recording head in a horizontal direction; an engageable member, disposed at a side of said carriage facing in a movement direction thereof, for engaging with the recording head, said engageable member is rotatable and translatable; and an operating lever, disposed at a side of said carriage facing in the movement direction, for translating and rotating said engageable member to abut the recording head to said abutment portion, and for rotating the recording head about the abutment portion; a second abutment portion for abutment with the rotating recording head to stop it in one rotational direction; and urging means for urging the recording head to said second abutment portion, wherein the recording head is mounted on and dismounted from said carrier by moving said operating lever in one direction and by moving it in the opposite direction, respectively. The ink jet recording head is detachably mountable to such a carrier.

In this aspect of the present invention, the operating mechanism for the mounting and dismounting of the recording head is disposed at a side facing in the direction of carrier movement, and the mounting and dismounting operation is effected by rotational and translational movements on a horizontal plane on the carrier, by which the widths, measured in the direction perpendicular to the carrier movement, of the carrier and the recording head can be efficiently used, and in addition, the movable range of the recording head for the mounting and dismounting can be reduced.

Therefore, the width, measured in the perpendicular direction, of the recording head which is limited in terms of size reduction of the recording apparatus, can be efficiently used for the volume of the ink container, and the dead space required by the movement of the recording head can be minimized.

In addition since no particular space is required for the mounting and dismounting operation, the size of the apparatus can be reduced.

It is a further object of the present invention to provide a carrier and a recording head mountable thereon provided with a mounting and dismounting mechanism for the recording head in which the moving range for the recording head for the mounting and dismounting can be minimized.

In an embodiment of the present invention, the motion of the recording head for the mounting and dismounting relative to the carriage is a combination of a translational motion and a rotational motion.

According to this aspect of the present invention, there is provided a carriage, movable along a predetermined path, for detachably mounting thereon an ink jet recording head, comprising: a hook for rotational and translational motion, said hook is engageable with the recording head by the rotational and translational motion; and a lever having a helical and planner cam surface which is engageable with said hook to produce the rotational and translational motion of said hook. Also, provided is a recording head mountable on such a carrier.

In this aspect of the present invention, the mounting and dismounting motion of the recording head includes the rotational and translational motion of the recording head provided by rotation and linear movements of the hook caused by operation of the lever.

Therefore, the moving range of the recording head required for the mounting and dismounting thereof can be minimized, and in addition, no particular space is required for the operation, so that the size of the apparatus can be reduced.

It is a yet further object of the present invention to provide an ink jet recording head, carrier which utilized advantageously the limited space allotted to the recording head.

In an embodiment of the present invention, in order to provide as large as possible ink container within the limited space, an abutment member disposed at the front of the carrier is made thin, and in order to reinforce the abutment member by a rib. The rib also functions as protecting an ejection side surface of the recording head.

According to this aspect of the present invention, there is provided a carriage, movable along a predetermined path, for detachably mounting thereon an ink jet recording head having an integral ink container: an abutment member disposed at a front of said carrier; and a rib in said abutment member, wherein said rib projects toward the front beyond an ejection side surface of the recording head, and the rib extends in a direction of movement of said carriage.

In this aspect of the present invention, the thickness of the abutment member is thin to allow for a larger ink container, for example. To compensate for the mechanical strength loss resulting from the thinning, a reinforcing rib is provided. The rib projects beyond a projected surface adjacent it to protect the projection surface from damage by the recording medium.

Therefore, the width, measured in a direction perpendicular to the movement direction of the recording head, of the recording head which is limited in terms of reduction of the size of the apparatus, can be efficiently used.

It is a further object of the present invention to provide a carrier having a substrate capable of providing proper electric connection between electric contacts together with the mounting operation of the recording head, and an ink jet recording head mountable on such a carrier.

According to this aspect of the present invention, there is provided a carriage, movable along a predetermined path, for detachably mounting thereon an ink jet recording head, comprising: a supporting plate; a flexible substrate along a surface of said supporting plate; an urging member, disposed between said substrate and the surface of said supporting plate, having a pattern of projections corresponding to electric contacts of said substrate. Also provided is an ink jet recording head mountable on the carrier.

In this aspect of the present invention, contacts of the substrate of the recording head and the contacts of the carrier can be contacted by a rotational motion in a horizontal plane made during the mounting operation of the recording head.

Therefore, the sliding motion is substantially eliminated in the contacting operation, so that the contacts between wrong contacts can be prevented.

In addition, the contacts are enhanced by the urging force provided by the projections, so that the electric connection is assured.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 18A and 18B are side views of a sheet confining mechanism, according to an embodiment of the present invention.

FIG. 19 is a perspective view of a rowel in a sheet discharging system, according to an embodiment of the present invention.

FIG. 20 is a front view of a sheet discharging roller according to an embodiment of the present invention.

DESCRIPTION OF THE PREFERRED EMBODIMENTS

Referring to the accompanying drawings, the preferred embodiments of the invention will be described.

Figure 1:
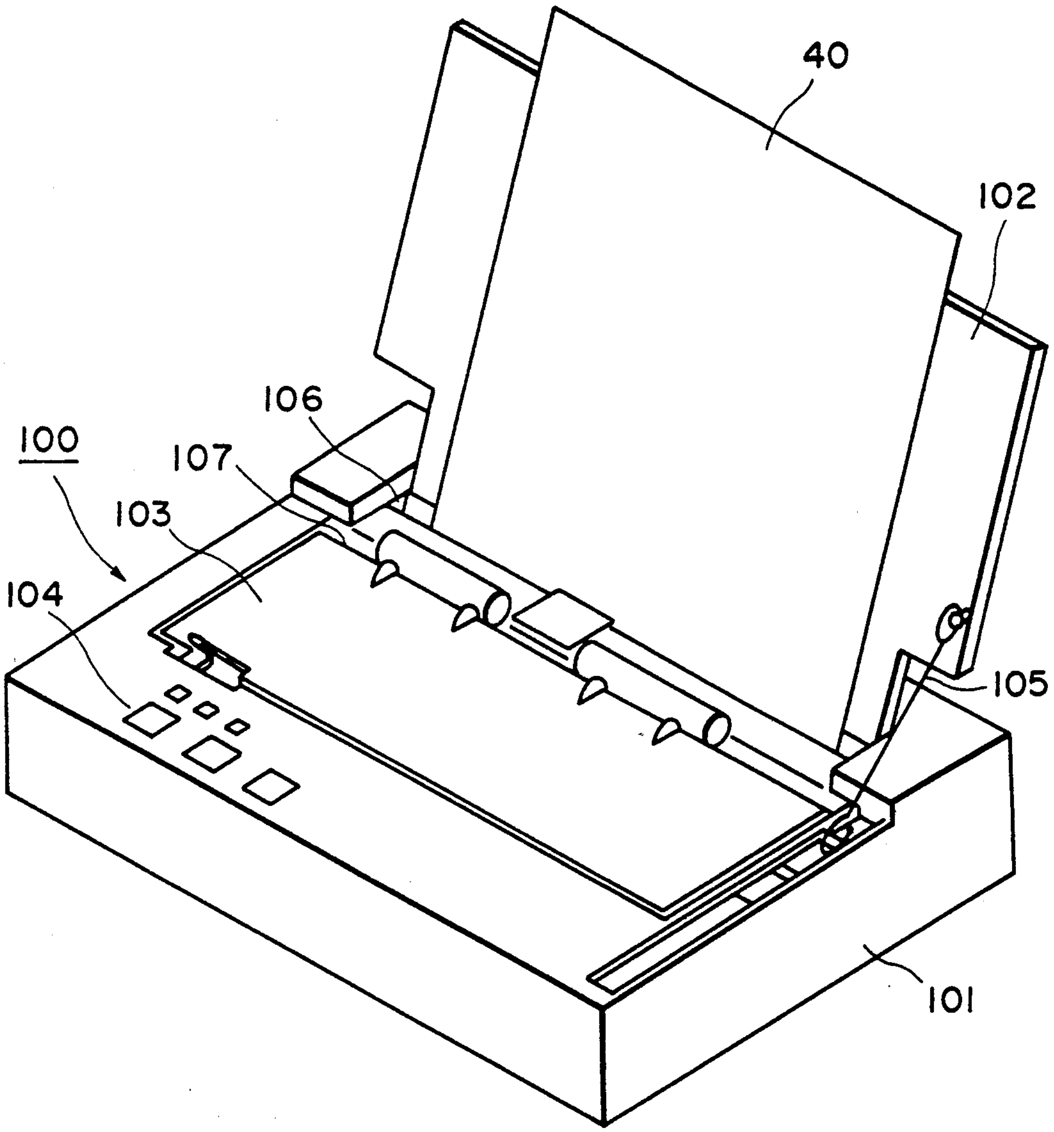
FIG. 1 a perspective view of an ink jet recording apparatus according to an embodiment of the present invention, illustrating an outer appearance thereof.

In FIG. 1, there is shown an ink jet recording apparatus 100 according to an embodiment of the present invention. The apparatus 100 is used selectively in a generally horizontal setting shown in FIG. 1 or in a vertical setting, as will be described hereinafter. The apparatus 100 is small and light.

The apparatus 100 comprises a casing 101, an outer cover 102 and an inner cover 103. When the apparatus 100 is not used, the outer cover 102 covers the inner cover 103, and therefore, the apparatus is compact. The user can accommodate the apparatus in a dedicated case and can carry it around.

When the apparatus 100 is used in the horizontal setting, as shown in this Figure, the part indicated by the reference numeral 106 functions as the recording material inlet. The outer cover 102 can be used as the discharge tray.

In either of the above cases, the part indicated by a reference numeral 107 functions as a sheet discharge outlet.

A positioning hook 105 functions to fix the position of the outer cover 102, designated by a reference numeral 104 is the operation keys and displays.

Figure 2:
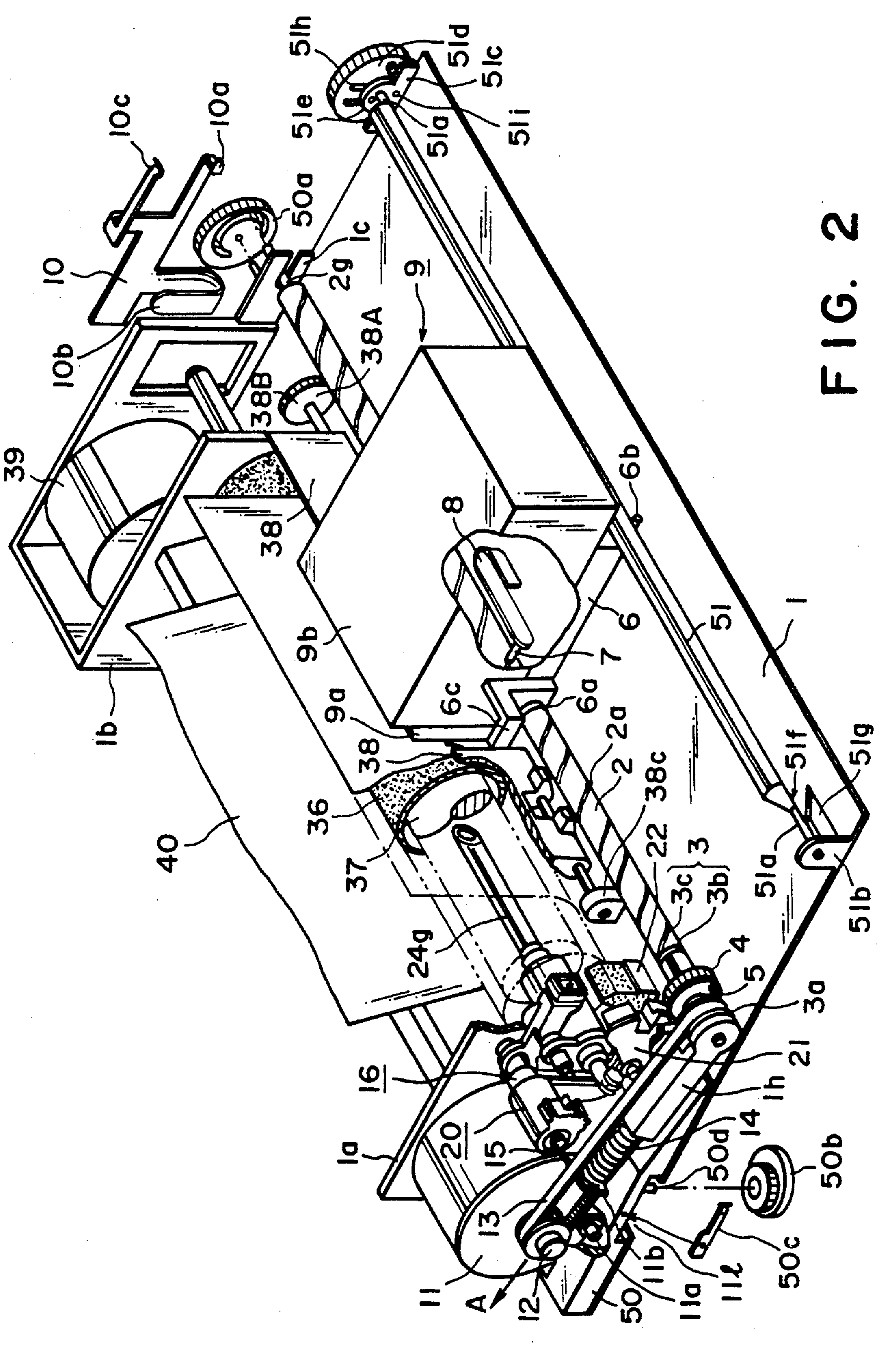
FIG. 2 is a perspective view of the apparatus of FIG. 1, illustrating the major portion of the apparatus without a cover.

Referring to FIG. 2, the major part of the apparatus will be described.

The apparatus comprises a base frame 1, a left side plate 1*a* functioning as a guide for a recording medium such as paper and a right side plate 1*b*. The base frame 1 is provided with an opening (not shown) for rotatably supporting the carrier motor, which will be described hereinafter.

A lead arm 1*h* is for supporting a lead screw 2 in the longitudinal and diametrical direction. The lead screw 2 is rotatably supported on a bearing of the lead arm 1*h*. The lead arm 1*h* is securedly fixed on a recovery system base 50 through an unshown plate.

The lead screw 2 is provided with lead groove 2*a* at a predetermined pitch faced to a recording range. The lead screw 2 is provided, at a carrier home position side, with a positioning groove 3*b* for the positioning at the time of a capping operation by a cap and an operation for correcting improper ink ejection and for preventing improper ejection. The positioning groove 3*b* is formed along the circumferential of the screw shaft. The positioning groove 3*b* is continuously and smoothly extended from the lead groove 2*a* through an introduction groove 3*c*.

The lead screw 2 has at its right end a shaft 2*g* coaxially with the lead screw 2, and has a shaft at the left side. The shafts are supported by bearings provided on a front part 1*c* of the side plate 1*b* and on the lead arm 1*h*, respectively. The shafts are rotatably supported by the bearings. A lead pulley 3 is mounted on the lead screw 2 and is provided with the above-described grooves 3*b* and 3*c* and a pulley 3*a* at its end. The pulley 3*a* receives driving force from a motor 11 through a timing belt 13.

The shaft 2*g* of the lead screw 2 is slidably engaged with a slit of the plate 1*c* functioning as a guide plate connected to the right side plate 1*b* and to the base frame 1. It is pushed in its thrust direction by a tongue 10*a* of a leaf spring 10 and is engaged with a cam slot of a cam plate 50*a* rotatably supported on a pin fixed on the guide plate 1*c*. Around the circumferential periphery of the cam plate 50*a*, a meshing teeth is formed which is engageable with a ratchet 10*c* of the leaf spring 10, by which the cam plate 50*a* can be locked at a desired rotational position. By the rotation and the locking of the cam plate 50*a*, the position, in the slot of the guide plate 1*c*, of the shaft 2*g* engaging with the cam slot is determined, so that the position of the lead screw 2 at the right end is determined. This adjusting structure is used for adjusting a gap between the recording head and the platen, which will be described hereinafter.

A clutch gear 4 is supported for sliding movement in the longitudinal direction on the lead pulley 3. It is fixed on the lead pulley 3 in the rotational direction by a key formed in the lead pulley 3, which will be described hereinafter in conjunction with FIG. 11, so that the rotation of the lead screw 2 is transmitted thereto. A clutch spring 5 is a compression spring to urge the clutch gear 4 toward the lead groove. A limiting member is provided between the clutch gear 4 and the lead pulley 3 to limit the moving range of the clutch gear 4 in the axial direction within a predetermined range.

A carrier 6 is supported on the lead screw 2 and is movable along the length of the lead screw 2. The carrier 6 is provided with an urging portion for pushing an end surface of the clutch gear 4 and is formed integrally with a left side of the carrier. The carrier 6 has a lead pin 7 engaging with a lead groove 2*a* of the lead screw 2 and is guided along a guiding opening (not shown) of the carrier 6 for the urging to the lead screw. A lead pin spring 8 has an end mounted to the carrier 6 and has the other end urging the lead pin 7.

A recording head 9 is mounted on the carrier 6. In this embodiment, the recording head is in the form of a cartridge containing as a unit a recording head element 9*a* and an ink container 9*b* (ink supply source). The cartridge is detachably mountable on the carrier 6, and is disposable when the ink therein is used up. In place of the electrothermal transducer, an electro-mechanical transducer element is usable. The former is preferable since then the ink ejection outlet can be manufactured at a high density since the manufacturing process is simple.

A hook 6c is fixed to a part of the carrier 6 to stably stop the recording head 9 at a capping position or the like.

A carrier guiding shaft 51 is slidably engaged with a guiding pin 6b formed on a rear end of the carrier 6. As will be described in conjunction with FIG. 4, the guiding shaft 51 has an eccentric shaft 51a, which is rotatably supported on side plate 51b and 51c provided at the opposite ends of the base frame 1. An end of the shaft 51a adjacent the side plate 51c is fixed to a positioning knob 51d. The positioning knob 51d is generally in the form of a circular disk and is provided, substantially at its center, with a leaf spring 51h in the form of a cantilever having a channel configuration. The leaf spring 51h is formed by lancing the part of the disk into the channel configuration. The end of the shaft 51a is fixed substantially at the center of the leaf spring 51h. The free end of the leaf spring 51h is provided with a projection 51i for fixing the rotational position of the knob 51d. The rotational position of the shaft 51 is fixed by the engagement between the projection 51i of the leaf spring 51h of the knob 51d and an opening 51e formed in the side plate 51c with the aid of the resilient force of the leaf spring 51h.

Figure 4A:
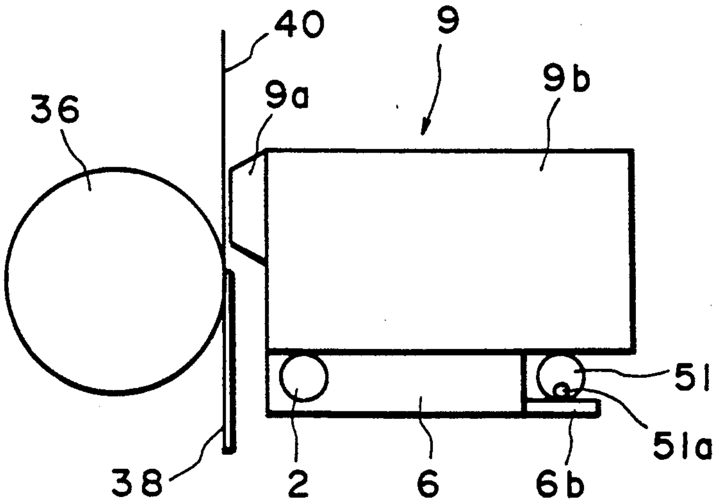
FIGS. 4A and 4B are side views illustrating different positions of a recording head relative to different recording materials.
Figure 4B:
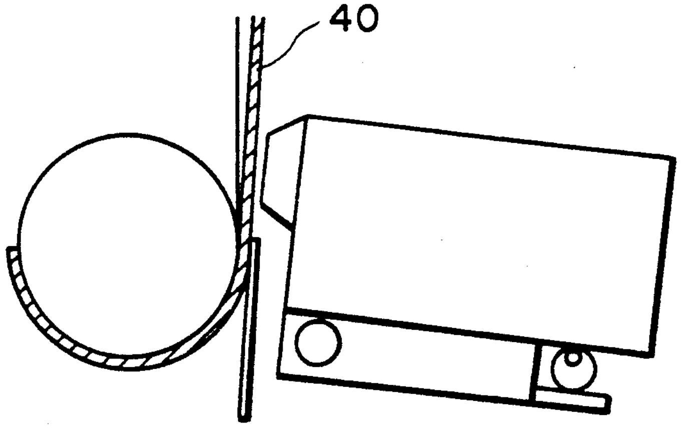

As shown in FIGS. 4A and 4B, this structure is used to properly adjust the gap between the recording surface of the recording sheet 40 and ink ejection outlets of the recording head element 9a in accordance with the material of the recording sheet 40. More particularly, the knob 51d is manually rotated, by which the distance between the shaft 51a and the pin 6b is minimum when the shaft 51 takes the position shown in FIG. 4A, and the distance may be maximum when the shaft 51 takes the position shown in FIG. 4B. By doing so, the recording head 9 rotates about the lead screw 2, so that the distance can be fixed to match a relatively thin plain paper (FIG. 4A) or a relatively thick recording paper such as envelopes (larger distance, as shown in FIG. 4B).

It should be noted that the above structure is to meet the materials of the recording sheet during the recording operation. The situation is different when the recording head 9 is moved to the recovery system at the left end of FIG. 2 when the recovery process is to be performed. More particularly, at this time, the positional relation has to be constant between the recording head 9 and the recovery system.

Figure 5A:
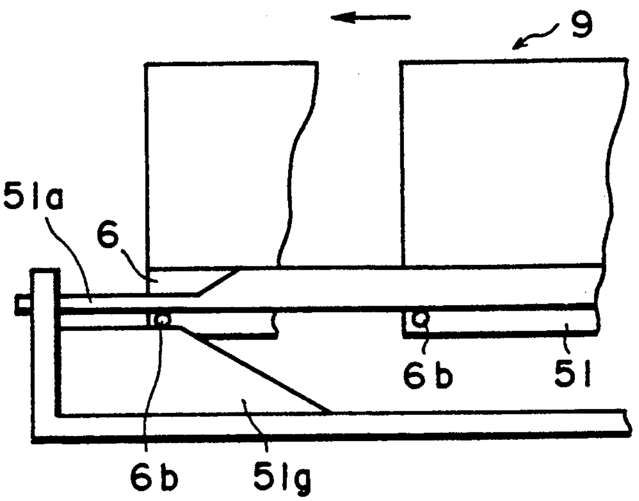
FIGS. 5A and 5B are rear views of a recording head at its home position in different states.
Figure 5B:
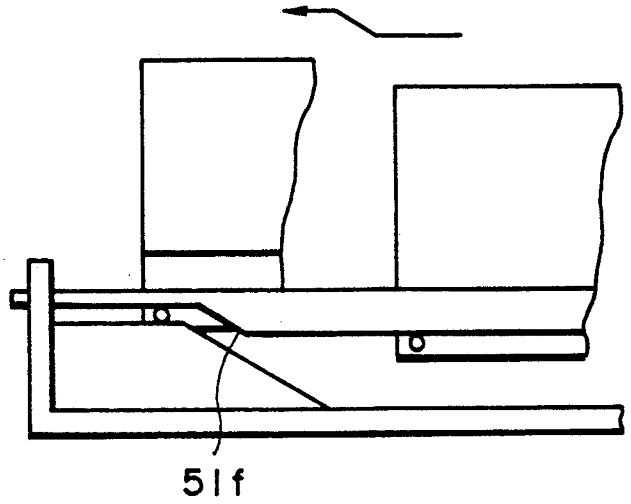

FIGS. 5A and 5B show the structure for providing the constant positional relation between the recording head and the recovery system during the recovery operation. FIGS. 5A and 5B correspond to FIGS. 4A and 4B. In FIG. 5A, the engagement between the shaft 51a and the pin 6b is effected without change in the height of the engagement position between the shaft 51 and the pin 6b. In order to maintain the constant height of the engaging position, one of the parallel surfaces of a trapezoidal cam 51g is engaged to the pin 6b.

In FIG. 5B, when the recording head 9 moves in the direction that the pin 6b is engaged to the shaft 51a, the height of the engaging position of the pin 6b changes. In consideration of this, the shaft 51 is provided with a tapered portion 51f, and correspondingly, the trapezoidal cam 51g has a tapered surface. Therefore, the height of the engagement between the pin 6b and the shaft 51 is changed by the tapered portion 51f, so that the constant height is maintained when the pin 6b engages to the portion 51a of the shaft.

With the structure described above, when the recording head 9 comes to the ejection recovery system, the height of the recording head 9 is always constant, by which the predetermined positional relationship can be maintained between the recovery system and the recording head 9.

The number of rotational positions of the recording head 9 is not limited to two, but may be larger with the positions therebetween to meet a larger number of thicknesses of the recording paper. In order to accomplish this, the number of engagement positions between the projection of the knob 51d and the whole 51e of the side plate 51c may be increased.

The rotation of the knob 51d is not limited to the manual rotation, but may be automatically effected by rotating the knob 51d in response to a key input corresponding to the recording sheet to be used, for example, utilizing the driving force of a sheet feeding motor or the like.

Referring back to FIG. 2, a carrier motor 11 for driving the carrier 6 is in the form of a pulse motor, for example. The left and right surfaces of the motor 11 are provided with pins 11a at aligned positions. The pins 11a (the right side one is not shown) are rotatably mounted in motor mounting holes of a recovery system base 50 movable on the base frame 1. It is a possible alternative that the pins are provided on the recovery system base 50, and the holes are formed in the side of the motor. The carrier motor 11 is, therefore, rotatable about the pins 11a. A projection 11b is extended integrally from the carrier motor 11 in parallel with the output shaft 12 of the motor. The projection 11b is abutted by a motor spring 14. The projection 11b is provided with a columnar projection, to which an end of the motor spring 14 in the form of a coil is fixed.

A motor pulley 12 is fixed to the output shaft of the carrier motor 11. The timing belt 13 is stretched between the motor pulley 12 and the pulley 3a mounted on the shaft of the lead screw 2. The motor spring 14 is in the form of a compression spring in this embodiment and is compressed between an end of the lead arm 1h and the spring receiving projection 11b of the carrier motor 11, by which the carrier motor 11 is urged in a direction A to apply tension to the timing belt 13. Designated by a reference numeral 15 is setting shaft, to which the recovery mechanism is mounted. The recovery mechanism includes means, projected from an unshown side plate fixed on the base 50, for maintaining good state of the ejection outlet forming surface, the cap and the other means contributable to the recovery from and the prevention of the improper ejection.

As described hereinbefore, the positional relation between the recovery mechanism and the recording head 9 is important. More particularly, the positional relation between the ejection side surface of the recording head 9 and the blade for wiping the ejection side surface is important to maintain the desirable wiping performance, and the distance between the cap and the ejection side surface is important to maintain the capping performance. Therefore, it is desirable that the positional relation is maintained constant between the recovery mechanism and the recording head 9.

On the other hand, the recording head 9 effects a recording operation while moving along the lead screw 2 by the driving force transmitted through the lead screw 2. During the recording operation, the distance between the recording sheet 40 and the recovery head 9 is desirably the same irrespective of the position in the movable range of the recording head 9. Therefore, an adjusting mechanism is desirably provided to adjust the distance between the recording head 9 and the recording paper, by which the recording head is shiftable, while maintaining the parallelism relative to the recording paper. However, such an adjusting mechanism may influence the constant positional relation with the recovery system.

Accordingly, in this embodiment, the carrier motor 11, the recovery system base 50 mounting the recovery system which will be described in detail hereinafter and the lead screw 2 are movable relative to the base frame 1.

The position of the lead screw 2 is adjusted at the opposite ends thereof by moving the base 50 and by moving the cam plate 50*a*. By the adjustment, the recording head 9 is made movable in parallel with the recording sheet 40 supporting the recording sheet.

Figure 6:
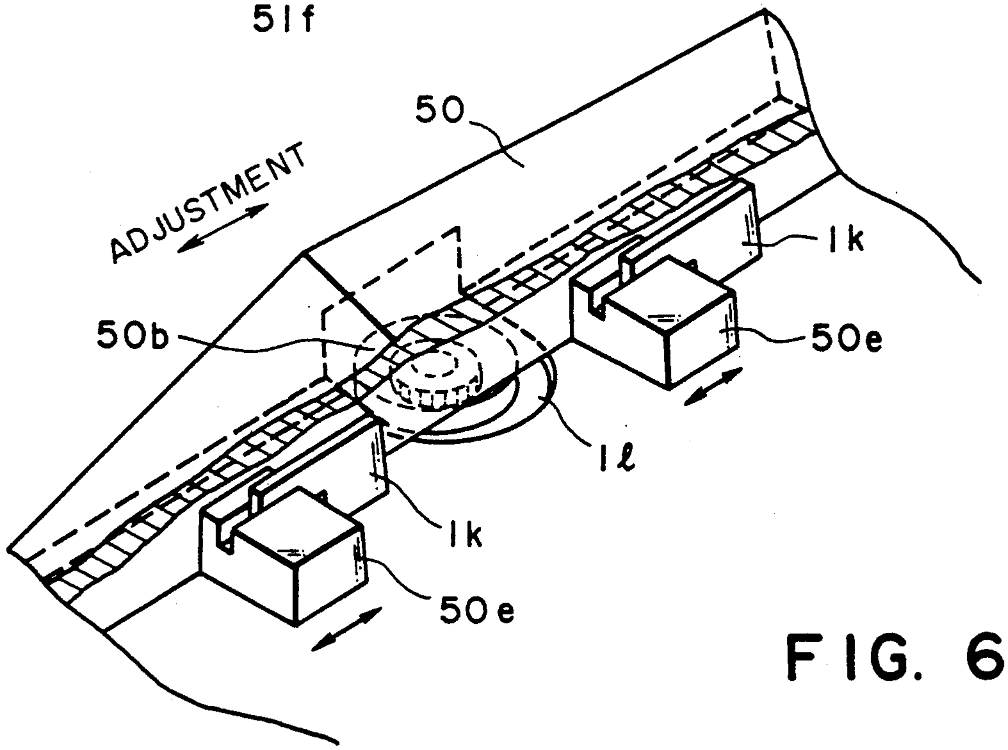
FIG. 6 is a partly broken perspective view of a base for a recovery system mechanism engaged with a base frame.

Referring to FIG. 6, there is shown a mechanism in the base 50 for accomplishing this. FIG. 6 is a perspective view of the recovery system base 50 as seen from the opposite side from FIG. 2 and is partly broken away. A guide member 50*e* is fixed to a side of a groove formed in a backside of the base 50. A groove of the member 50*e* is engaged with a guide portion of a guiding member 1*k* having an L-shape, fixed on the base frame 1, by which the movement direction of the base 50 is limited, and in addition, the base 50 is prevented from rising from the base frame 1.

As will be understood from FIG. 2, when the cam plate 50*b* is rotated about a pin 50*d* mounted on the base 50, by which the cam surface is contacted to a certain part of the surface of the cam slot 1*l* of the base frame 1 to urge the contact surface. By doing so, the base 50 is moved by the reaction in the direction guided by the member 50*e* and the member 1*k*.

The cam structure may be modified so that the cam plate is rotated about a predetermined axis by operating a pin engageable with a cam slot formed in the cam plate.

By the movement, the carrier motor 11 on the bas 50 and the driving system associated with the motor 11, more particularly, the timing belt 13, the pulleys 3 and 12 and the lead screw 2, and the recovery system mechanism mounted on the base 50, are moved, by which the position of the lead screw 2 at the recovery system side is adjusted.

On the other hand, a fine adjustment of the other end of the lead screw 2 is accomplished by rotating the cam plate 50*a*.

By the above adjusting operations, the lead screw 2 is made parallel with the recording paper, and the recording head can be adjusted for the movement parallel with the recording sheet.

The adjusting operations are performed in this embodiment during the manufacturing of the recording apparatus, using an assembling robot. However, the adjusting operations can be performed by a user after the apparatus is used for a long period of time, or at the time of the other repairing operations.

Figure 7A:
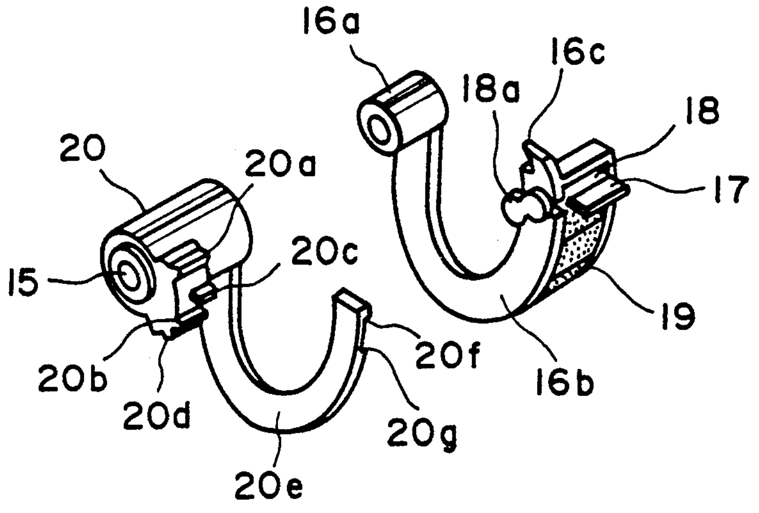
FIGS. 7A, 7B and 7C are perspective views showing a recording head wiping blade and an ink carrier.
Figure 7B:
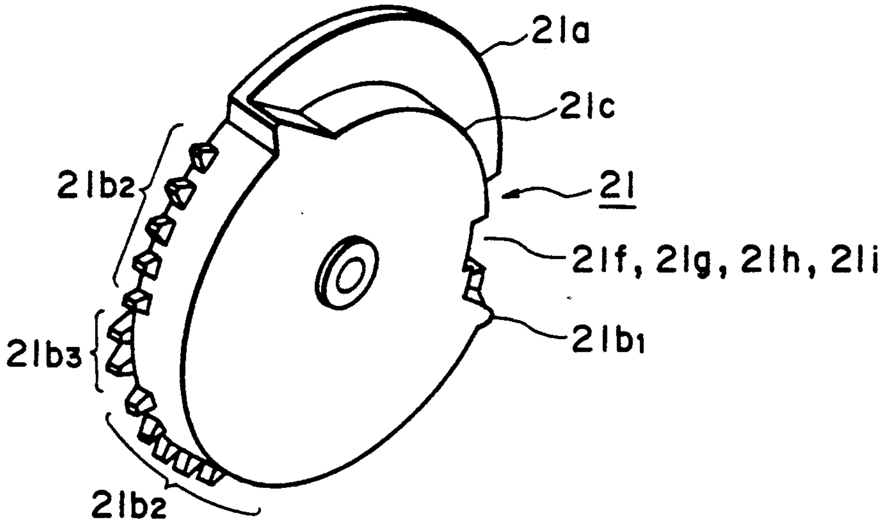
Figure 7C:
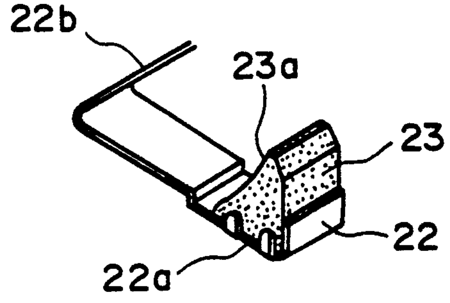

Referring to FIGS. 7A, 7B and 7C with continued reference to FIG. 2, the description will be made as to means for maintaining the good condition of the ejection side surface of the recording head, which is a part of the recovery system.

In FIG. 7A, a blade lever 16 has a boss 16*a* rotatably mounted on a setting shaft 15. The blade lever 16 has an arm 16*b* and a hook 16*c*. A blade 17 serves to wipe the surface of the recording head at which the ink ejection outlets are formed. The blade is made of silicone rubber, chloroprene rubber or hydrogen containing nitrile butadiene rubber or another elastic material. A blade shaft 18 clamps at its central position the blade 17 in the manner that the blade 17 extends parallel to the shaft 15. The blade shaft 18 is rotatably mounted on the blade lever 16. A rotatable member 18*a* is formed integrally with the blade shaft 18. An ink carrier 19 is made of sintered plastic material, urethane foam material or the like, which is hydrophilic and porous and is fixed to the blade lever 16 at a position below the blade 17. The blade 17 and the ink carrier 19 are placed at such a position that they are overlapped with the cap 35 which will be described hereinafter, as seen from the head element 9*a*, so that they are actable on the head element 9*a* at the same position. The overlapping positional relation is advantageous because it can reduce the width of the apparatus in the scanning direction.

A setting lever 20 is rotatably mounted on the setting shaft 15. The set lever 20 is provided with stopping teeth 20*a* and 20*b*, a starting tooth 20*c* and a rotating tooth 20*d*. The starting tooth 20*c* has a thickness (measured in the longitudinal direction of the lead screw 2) which is approximately one half of the width of the other teeth. An arm 20*e* of the setting lever 20 is partly cut-away in the direction of its thickness, by which a setting surface 20*f* and a resetting surface 20*g* are provided. The surfaces 20*f* and 20*g* are effective to provide an accommodation for the rotating member 18*a* of the blade shaft 18 mounted to the blade lever 16, in which the blade 17 is movable between a projected position and a suspending position by the selective engagement of the rotatable member 18*a* with the surface 20*f* or the surface 20*g*.

A timing gear 21 is rotatably mounted on the base 20 by an unshown supporting member.

As shown in FIG. 7B, the timing gear 21 is provided with a stopping cam 21*a* for engagement with the stopping teeth 20*a* and 20*b* of the setting lever 20 described above, at a part of the periphery of the timing gear 21. It is further provided with three driving teeth 21*b*1, 21*b*2 and 21*b*3 which are partly cut away. It is further provided with a capping cam 21*c* at a predetermined position to swing a capping lever which will be described hereinafter. Furthermore, it is provided with a piston setting cam 21*f* for urging a piston of a pump which will be described hereinafter. The piston setting cam 21*f* is in the form of a face cam. Also provided is a piston resetting cam 21*g* at a predetermined distance from and correspondingly to the piston resetting cam 21*f*.

A spring 22 functions to support an ink absorbing material 23 and is fixed to the base 50 at the position shown in FIG. 2, that is, at the position below the capping position by the cap 35. As shown in FIG. 7C, it has an absorbing material supporting portion 22*a* and a spring 22*b* for rotating the pump which will be described hereinafter. The ink absorbing material 23 is made of material which is hydrophilic and porous, similarly to the ink carrier 19. The ink absorbing material 23 has a cleaning portion 23*a* to which the blade 17 is contactable when it moves down. The lower portion of the ink absorbing material 23 is formed into an absorbing surface 23*b* to which the ink carrier 19 is contacted to transfer the ink. The absorbing material supporting portion of the supporting spring 22 is urged upwardly with small resilient force, so that it is locked at a predetermined position by an unshown stopper. Therefore, when the ink carrier 19 is contacted to the ink absorbing material 23, the ink absorbing material 23 displaces downwardly to flex the ink absorbing material spring 22 to secure the contact therebetween.

Figure 8:
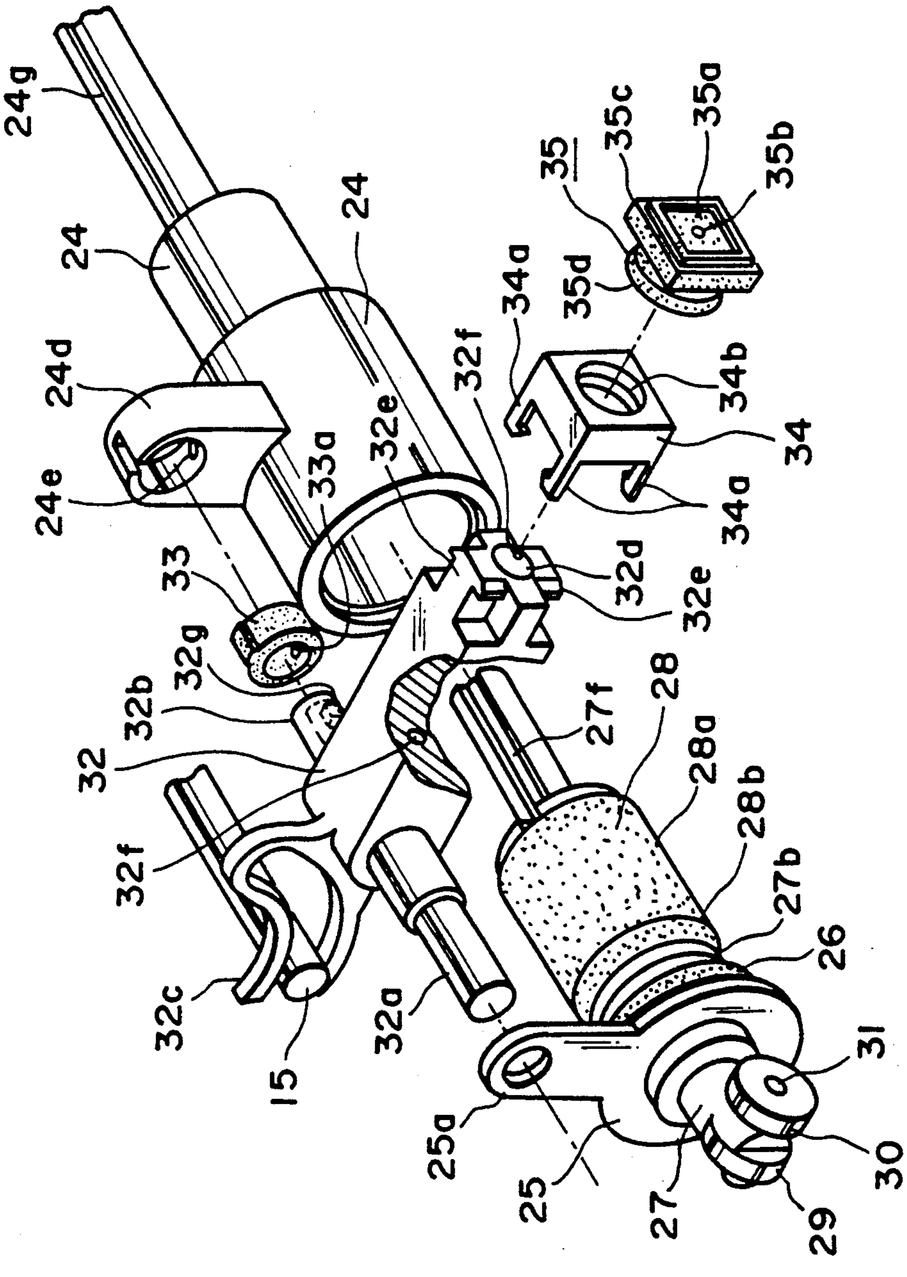
FIGS. 8 and 9 are an exploded perspective view and a sectional view of a sucking and recovery system for the recording head.
Figure 9:
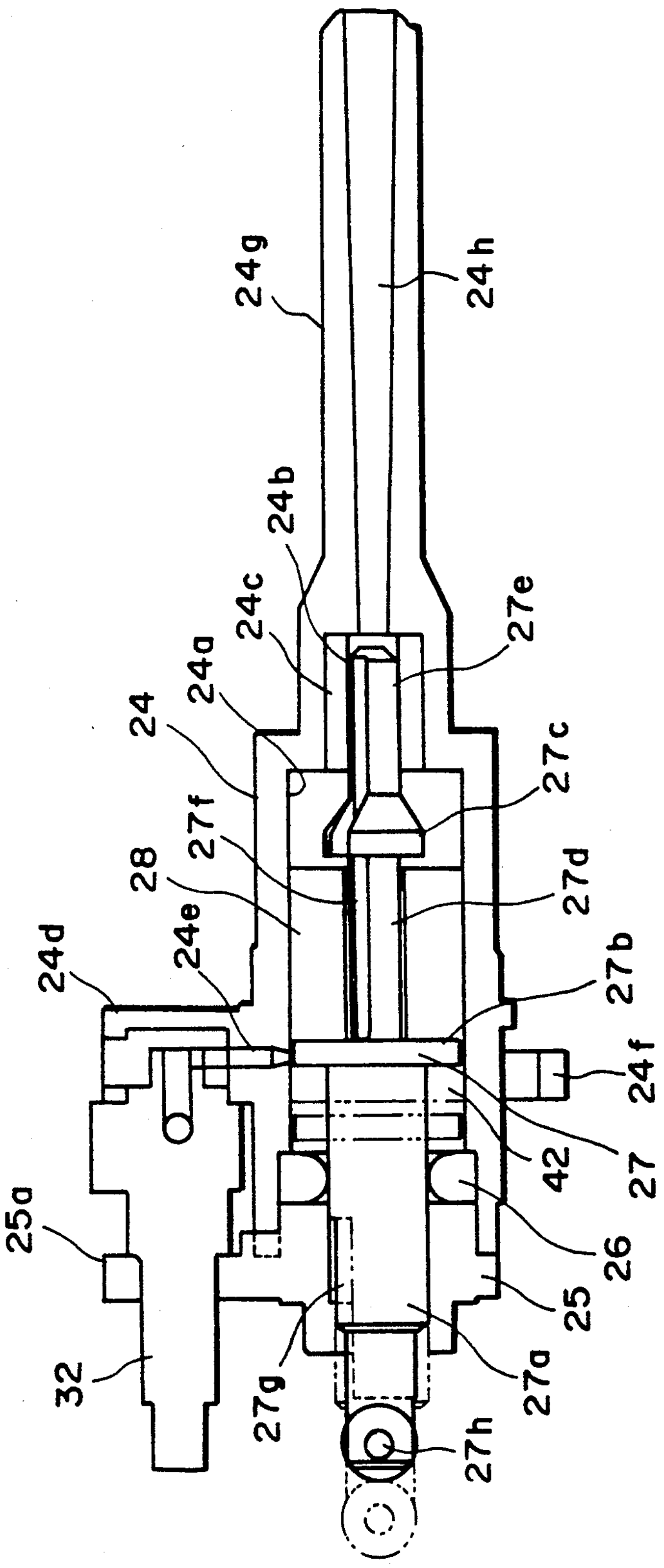

Referring to FIGS. 8 and 9 mainly, the description will be made as to a recovery system unit which is a part of the recovery system mechanism. In FIGS. 8 and 9, a cylinder 24 has a cylinder portion 24*a* and a guide portion 24*b* for guiding a piston shaft 27 which will be described hereinafter. The inner side of the guide portion 24*b* is partly cut-away in its longitudinal direction to provide an ink passage 24*c* for residual ink. A projection 24*d* functions to receive a cap lever and has a lever seal 33 engaged therewith. An ink passage 24*e* is opened at a predetermined position in the cylinder 24*a*. A rotating lever 24*f* is formed integral with the cylinder 24 and is urged in the rotational direction by the spring portion 22*b* of the ink absorbing member supporting spring. 22. A residual ink pipe 24*g* is integrally formed with the cylinder 24, and an end thereof is cut into an acute angle, so that it can be easily inserted into residual ink absorbing material which will be described hereinafter. An ink passage 24*h* is formed in the residual ink pipe 24*g*.

A cylinder cap 25 is press-fitted into an end of the cylinder 24. A lever guide 25*a* is disposed at a position faced to the cap lever receiver 24*d* of the cylinder 24.

A piston seal 26 is inserted into the cylinder 24, and it has a smaller inside diameter to provide a predetermined contact pressure relative to the piston shaft which will be described below. The surface thereof may be coated with lubricating material to reduce the force required to slide the piston.

The piston shaft 27 has an operating shaft 27*a*, a piston confining collar 27*b*, a piston receptor 27*c*, a connecting rod 27*d* and a guide 27*e*. A groove 27*f* functioning as an ink passage is formed along the connecting rod 27*d* and the guide shaft 27*e*. A rotation stopper 27*g* is formed as a groove in the operating shaft 27*a*. A bearing 27*h* is provided at an end of the operating shaft 27*a*.

A piston 28 has a main portion as an inner layer as seen from the cylinder side, which is made of elastic and porous material. It may be a foam material (sponge or the like) having independent pores or a porous material having fine continuous pores. The porous material having the continuous pores such as urethane foam having them is preferable. It may be such that plural continuous pores exist in a direction crossing with the direction of elastic deformation. The outside diameter thereof is larger than the inside diameter of the cylinder 24 by a predetermined degree so that it is compressed to a proper extent when it is inserted into the cylinder 24. The foam material is so oriented that the solid (skin) layer of the material is at the outer peripheral 28*a* and an end surface 28*b* contacted to the piston confining collar 27*b* of the piston shaft 27. Even if the material of the piston is of communicating foam type, the skin film does not allow the liquid communication, and therefore, the skin film provides the function of the piston. If the material without skin film is used, a coating layer may be provided.

Designated by a reference 42 is a pumping chamber. A piston pressing roller 29 is rotatably mounted at an end of the piston shaft 27. A piston resetting roller 30 is rotatably mounted at the end of the piston shaft 27. These rollers are supported on a pin 31.

A cap lever 32 has a rotational shaft 32*a*, an ink guide 32*b* and a lever guide 32*c*. At an end thereof, a sealing surface 32*d* which is spherical convex. The cap lever 32 is provided with a vertical pair of engaging members 32*e* for engagement with pawls of the cap holder 34. An ink passage 32*f* extends from the sealing surface 32*d*, through the inside of the lever 32, deflected at 90 degrees, through the center of the ink guide 32*b*. The passage opens at the end thereof. At a lower position of the ink guide 32*b*, a cut-away portion 32*g* is formed. The cut-away portion 32*g* is effective to connect the ink passage 24*e* through the communicating hole 33*a* of the lever seal 33 to the inside of the cylinder 24*a*.

A lever seal 33 is mounted on the ink guide 32*b* and is press-fitted into the cap lever receptor 24*d*. A communication hole 33*a* provides liquid communication between the cut-away portion 32*g* of the ink guide 32*b* and the ink passage 24*e*.

A cap holder 34 is faced to a hook 34*a* for engagement with an engaging portion 32*e* of the cap lever 32. An opening 34*b* is for mounting the cap 35.

The cap 35 functions both to close the recording head so as to prevent the ink from drying and to seal the recording head when the ink is sucked therefrom. The cap 35 has a capping portion in which a sucking port 35*b* is formed, and therefore, opens toward the cap holder 34 through the center of the cap 35.

A flange 35*c* functions as a latch when mounted on the cap holder. The flange 35*c* has a cap seal 35*d* which is spherically concave to conform the sealing surface 32*d* of the cap lever 32. When it is urged to the cap lever 32, only the central port 32*h* communicates, and the other portion is sealed. Since the seal portions 32*d* and 35*d* are spherical, they are conformed to each other excellently. The recording head element 9*a* has a step on the ejection side surface, and even if so, the cap can accommodate the step to provide the stabilized sealing condition.

Referring back to FIG. 2, a sheet feeding roller 36 for conveying a recording medium such as paper or a sheet of paper, is provided. It can be produced by, for example, applying elastic paint (urethane resin or acrylic resin material) on the surface of a drawn aluminum pipe. The roller 36 functions as a platen for limiting the surface of the recording medium on which the recording is effected, by its outer surface, and also functions to accommodate the residual ink at the inside thereof. Residual ink absorbing material 37 is within the roller 36, and it comprises a thin pipe made of plastic material such as vinylchloride or the like and polyester fibers or another absorbing material to enhance the ink absorption in the longitudinal direction. Into the residual ink absorbing material 37, a residual ink pipe 24*g* of the cylinder 24 is inserted. Even if the recovery system mechanism movable by the movement of the base 50, the pipe 24*g* is supported in the absorber 37 in the manner that the movement is impeded. The fibers of the absorbing material are not liquid absorbing, such as resin or metal, but may be of slightly liquid absorbing nature.

A sheet confining plate 38 is made of fluorinated resin or a material to which carbon fibers are mixed, for example. As shown in FIG. 3, it is divided into four portions, which are mounted on the base frame 1. A shaft 38A is provided to release the confining force of the confining plate 38. To an end of the shaft 38A, a gear 38B is fixed, and the other end thereof is engaged with a bearing 38C for supporting the shaft 38A. The bearing 38C is fixed on the base frame 1. The gear 38B is meshed with a gear of a release lever, which is not shown. A sheet feeding motor 39 is coupled with the sheet feeding roller 36 through a reduction mechanism having a predetermined reduction ratio.

Designated by a reference numeral 40 is a recording medium such as paper or film.

The operation will be described.

In normal recording operation, the rotation of the shaft of the carrier motor 11 rotates the lead screw 2 through the timing belt. Then, the carrier 6 moves in the scanning direction through the engagement between the lead groove 2*a* and the lead pin 7. Since the carrier motor 11 is urged by the motor spring 14, the timing belt is always stretched, to provide good drive transmission.

The inertia exists upon movement of carrier 6, upon start and upon termination, but the weight of the motor 11 absorbs the inertia, so that the force applied to the motor spring 14 is small. The load required to the motor is also small. If an air damper or an oil cylinder in association with the motor spring 14, the noise attributable to the vibration of the rotor of the motor can be reduced upon the start and stop of the carrier. By properly selecting the weights of the motor and the carrier and the damper coefficient, the overshooting of the motor can be reduced, so that the noise can be reduced.

Figure 10:
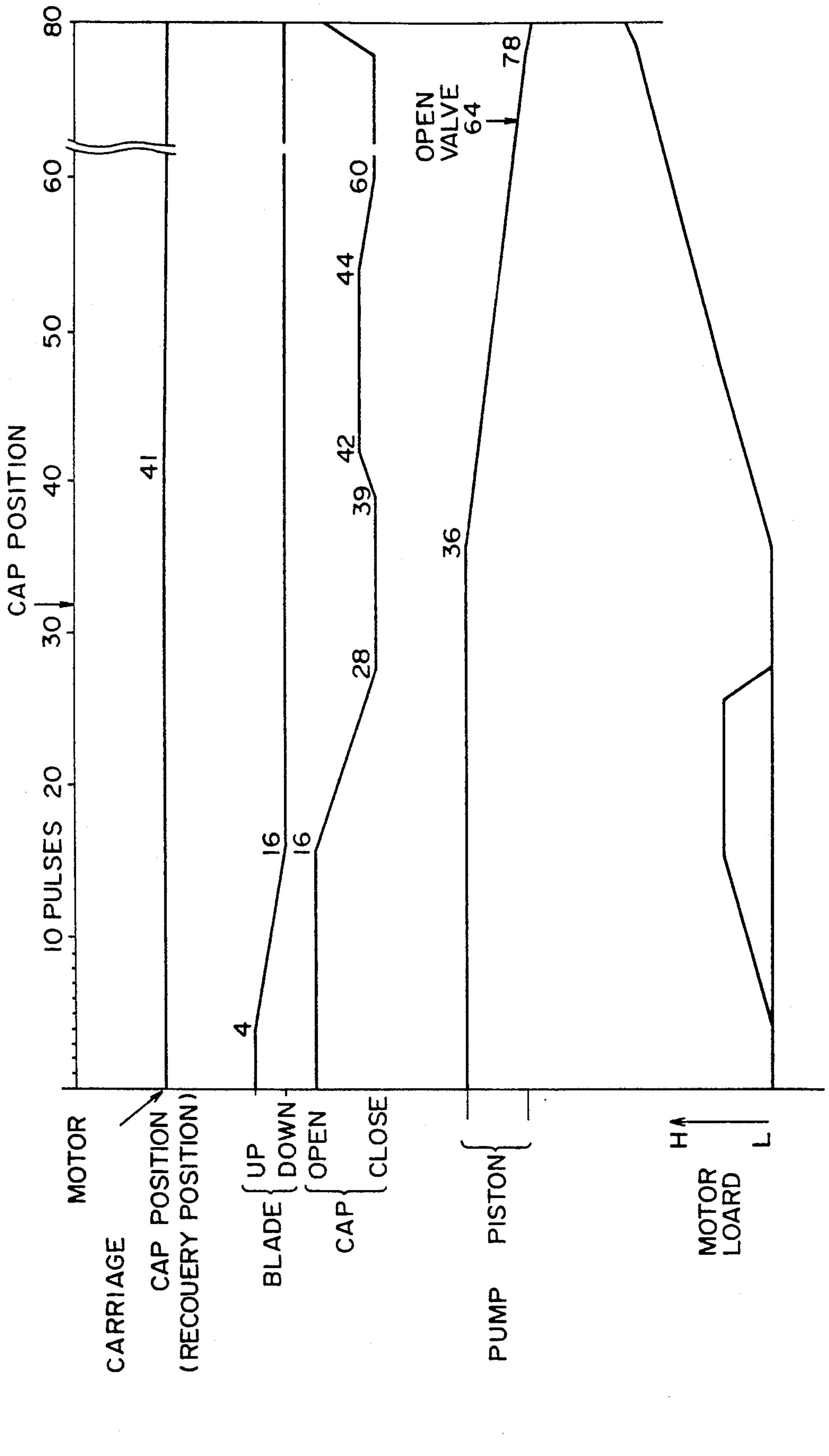
FIG. 10 is a timing chart of operations of various parts of the apparatus according to this embodiment.

Referring to FIGS. 10 and 16, the operation of the apparatus when the apparatus is not performing the recording operation.

FIG. 10 is a timing chart, wherein it will be understood that the operational timing of various parts can be determined on the basis of the number of pulses supplied to the motor.

Figure 11:
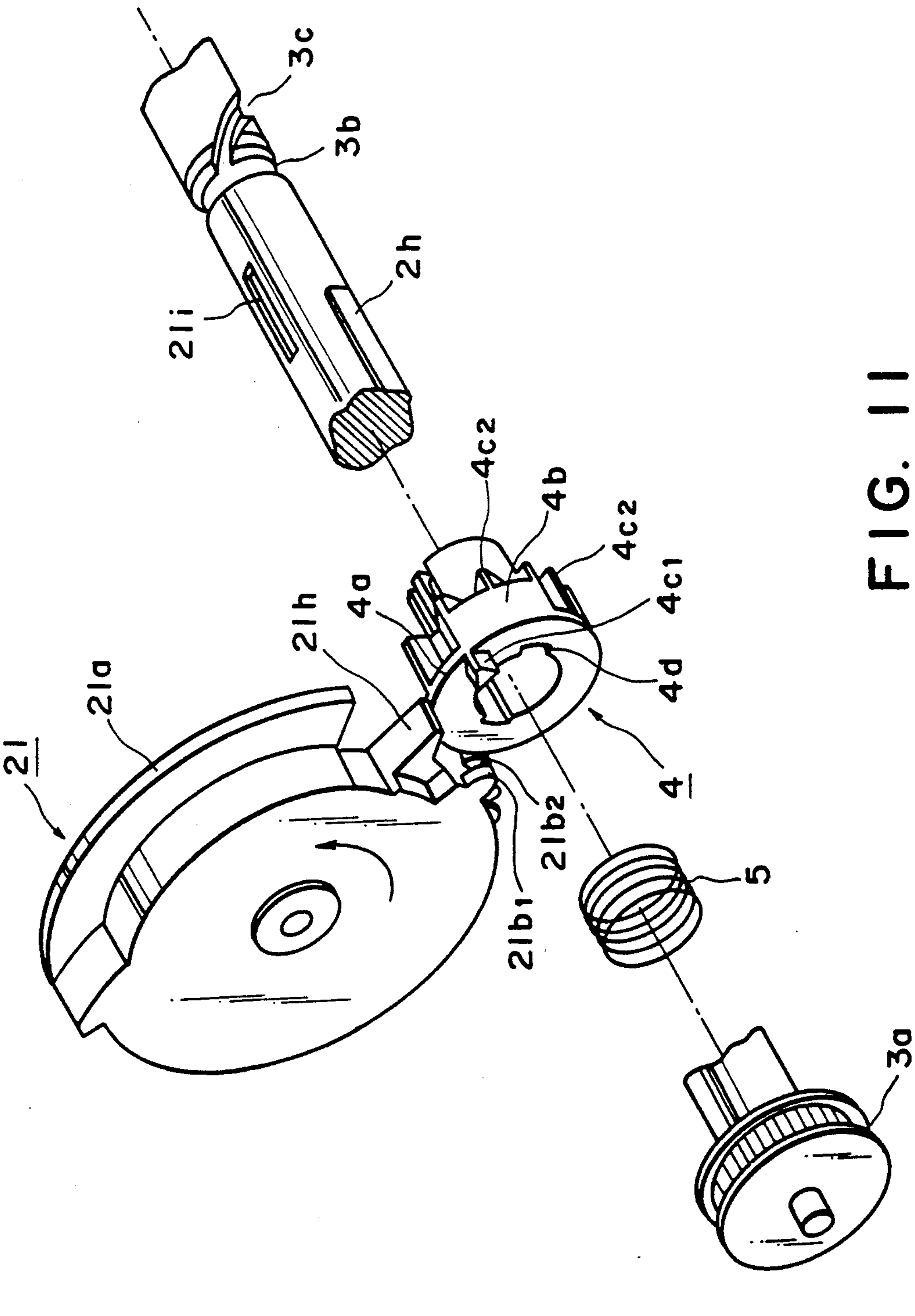
FIG. 11 is a perspective view of a clutch mechanism for transmitting driving force to the recovery system mechanism, in the apparatus of this embodiment.

FIG. 11 is a perspective view showing the structure of the clutch gear 4 and the timing gear 21. The key groove 4*d* of the clutch gear 4 is engaged with the key 2*h* of the lead screw 2, by which the clutch gear is slidable on the lead screw, while it is rotatable together with the lead screw 2. The clutch gear 4 is urged by the spring 5 toward the carrier 6, so that during the recording operation, it is at a predetermined position along the groove 2*i* of the lead screw 2 and rotates together with the lead screw 2. When the recording head 9 moves to the home position, the clutch gear 4 is urged by the carrier 6 to be engaged with the timing gear 21.

The clutch gear 4 has a starting tooth 4*c*1 and a driving teeth 4*c*2 which are formed at different positions of the clutch gear in the direction of the width thereof. In addition, the driving teeth 4*c*2 are not formed uniformly over the entire circumferential periphery, but has a curved surface position 4*b* at a part thereof. The clutch gear 4*a* has a flange 4*a* along the entire circumferential periphery thereof.

The timing gear 21, as has been described in conjunction with FIG. 7B, is provided with the starting teeth 21*b*1 and two different driving teeth 21*b*2 and 21*b*3. The teeth 21*b*1, 21*b*2 and 21*b*3 are formed at different positions of the gear 21 in the direction of the width thereof.

Figure 12A:
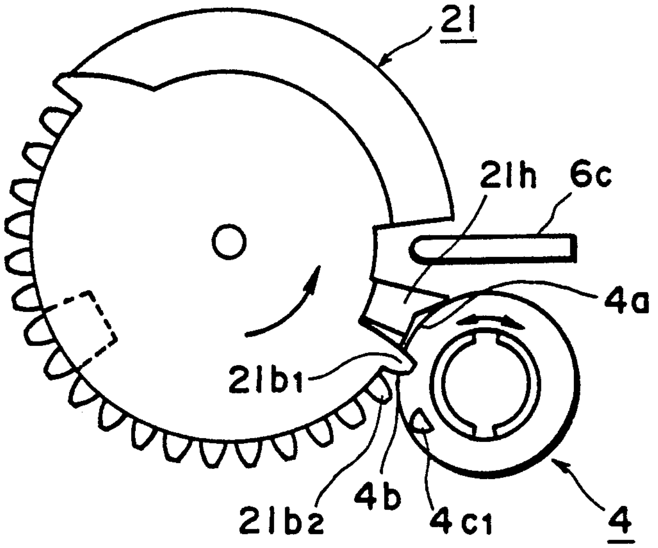
FIGS. 12A, 12B and 12C are side views illustrating engagement among the clutch gear of FIG. 11, a hook and a timing gear.
Figure 12B:
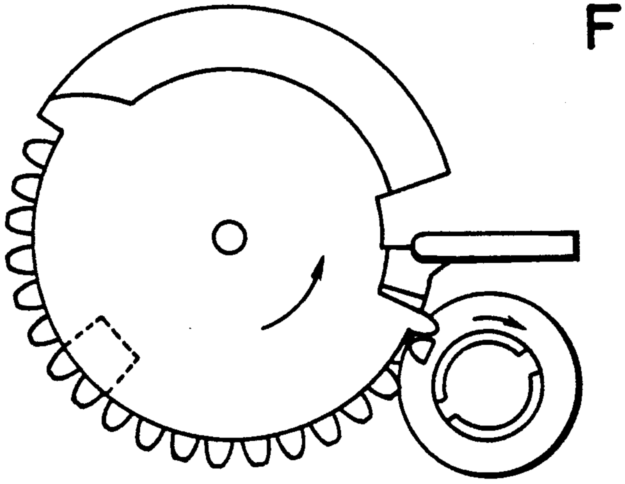
Figure 12C:
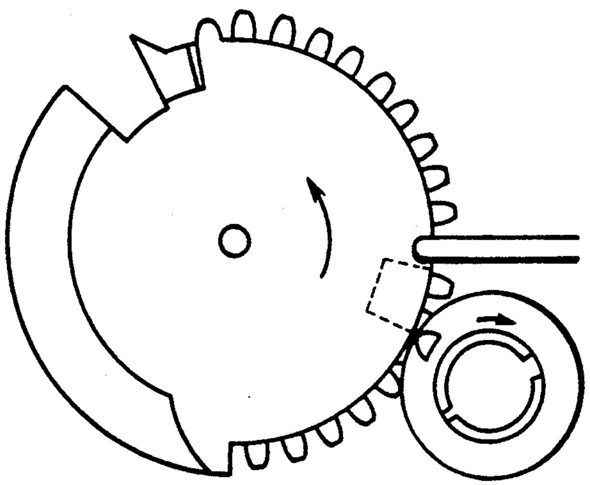
Figure 13A:
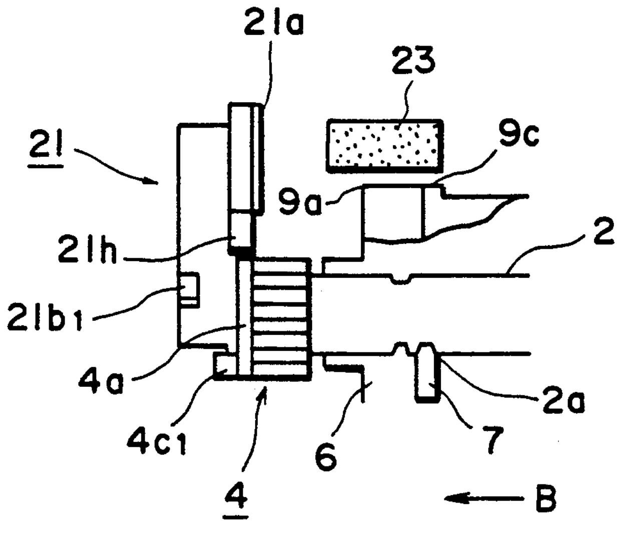
FIGS. 13A and 13B are front views showing engagement among the clutch gear, the hook and the timing gear shown in FIGS. 12A, 12B and 12C.

FIGS. 12A, 12B and 12C and FIGS. 13A and 13B show various states of engagement between the clutch gear 4 and the timing gear 21. FIGS. 12A and 12B show the states which is assumed during the normal recording operation. In the state of FIG. 13A, the lead pin 7 is not at this position, though. Above the ink absorber 23, the blade 17 and ink carrier 19 are disposed, although not shown in the Figure.

At this time, the clutch gear 4 rotates together with the rotation of the lead screw 2. Since, however, the starting tooth 4*c*1 and the starting tooth 21*b*1 are out of engageable positional relation (FIG. 13A), the timing gear 21 does not rotate. In addition, since the driving teeth 21*b*2 at the left end of the timing gear 21 and the flange 21*h* are at the engageable (interferable) positions with a small clearance from the flange 4*a*, the timing gear 21 is prevented from rotation in any direction.

Therefore, the timing gear 21 does not rotate unintentionally even if an erroneous manual force is applied or an unexpected rotational force is applied to the timing gear 21. Thus, the operating position of the recovery system is prevented from deviation.

Figure 13B:
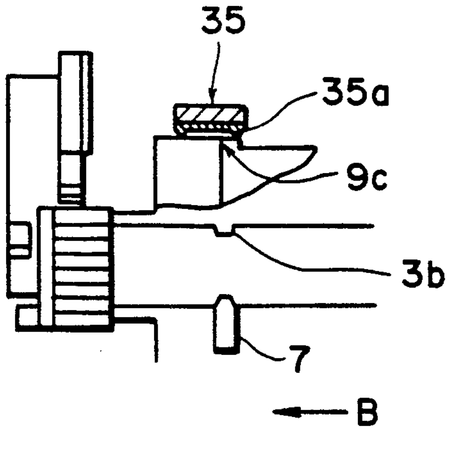

When the recording head 9 is moved toward the home position to such an extent that the carrier 6 urges the clutch gear 4, the positional relation between the clutch gear 4 and the timing gear 21 becomes finally as shown in FIG. 13B. During the process, the engageable positional relation is established between the starting tooth 4*c*1 and the starting tooth 21*b*1 (at this time, however, the lead pin 7 is not yet at this position).

Then, with the movement of the lead pin 7 of the carriage 6 from the groove 3*c* to the groove 3*b* of the lead screw 2 (FIG. 1), the clutch gear 4 rotates in the clockwise direction in FIG. 12A, by which the positional relation changes from the state shown in FIG. 12A to the state shown in FIG. 12C. Until the starting tooth 4*c*1 is engaged with the starting tooth 21*b*1, the timing gear does not move unintentionally to engage first the other teeth, since the curved surface portion 4*b* (non-engaging portion) shown in FIG. 11 is closest to the timing gear 21.

Therefore, the engagement between the clutch gear 4 and the timing gear 21 always starts by the engagement between the starting teeth thereof, so that the rotation of the timing gear 21 starts from the correct position at all times.

This assures the correct operation of the recovery system driven through the timing gear 21.

An additional advantage is that the mounting positional accuracies of the clutch gear 4 and the timing gear 21 are not required to be very high.

The driving tooth 21*b*3 of the timing gear 21 provided at the different position shown in FIG. 7B is brought into engagement when the curved surface portion 4*b* is contacted again to the timing gear 21. If this driving teeth are at the same position as the driving gear 21*b*2, they are contacted to the curved portion 4*b*. Therefore, the driving teeth are engaged at the deviated position.

As long as the timing gear 21 is rotated by the engagement of the driving teeth, the hook 6*c* of the carrier 6 slides on the surface of the timing gear 21 opposite from the recording region.

By doing so, the recording head 9 is prevented from aparting from the home position (it may occur when the lead pin 7 is away from the groove 3*b* before the engagement between the predetermined teeth, for example). This is because the lead screw 2 rotates during the recovery processing operation with the recording head 9 at the home position, so that the lead pin 7 can move to the groove 3*c*.

In the foregoing embodiment, the series of recovery operation is effected by two rotations of the lead screw, but this is not limiting, and the degree of the rotation may be properly selected by one skilled in the art. Thus, the latitude in the design of the clutch mechanism or the like can be increased.

Figure 14A:
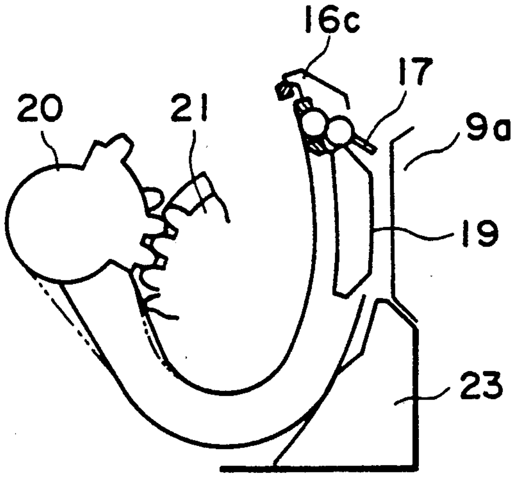
FIGS. 14A, 14B, 14C and 14D are side views illustrating sequential operations of the blade and the ink carrier.
Figure 14B:
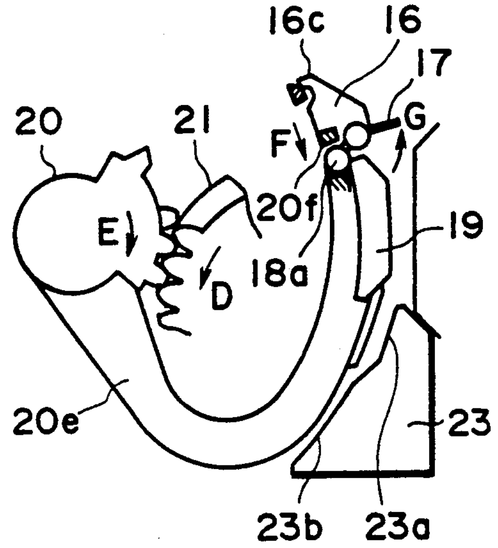
Figure 14C:
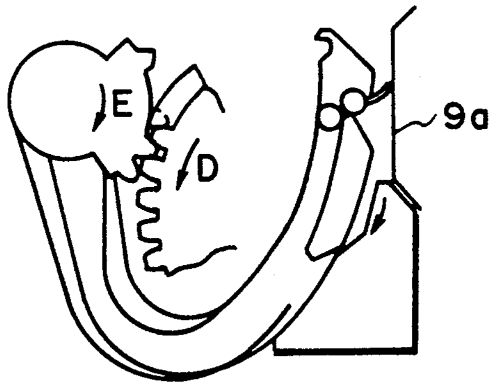
Figure 14D:
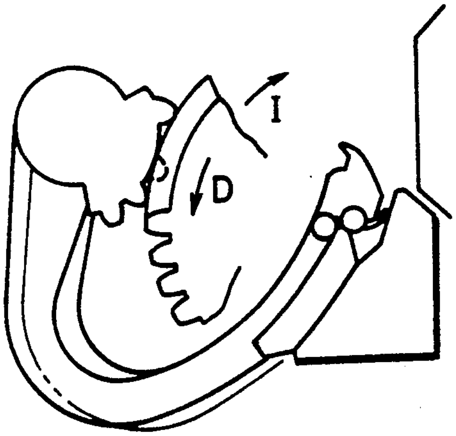
Figure 15A:
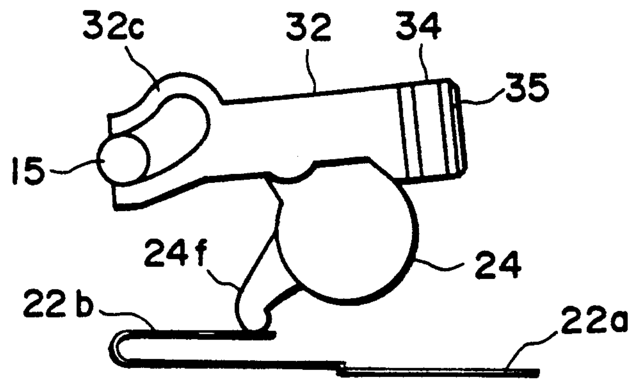
FIGS. 15A, 15B and 15C are side views illustrating sequential operations of a cap.
Figure 15B:
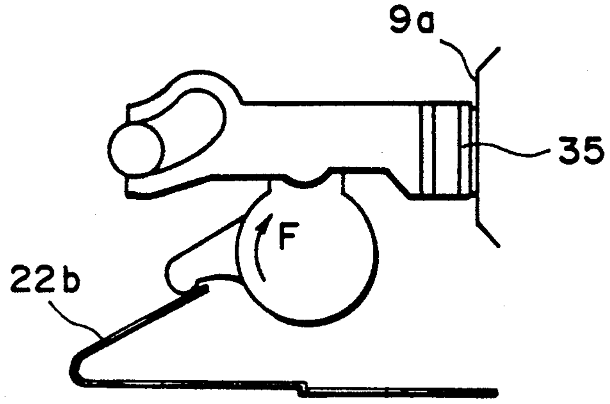
Figure 15C:
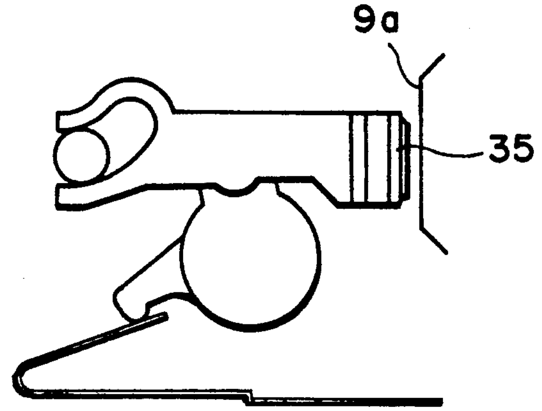
Figure 16A:
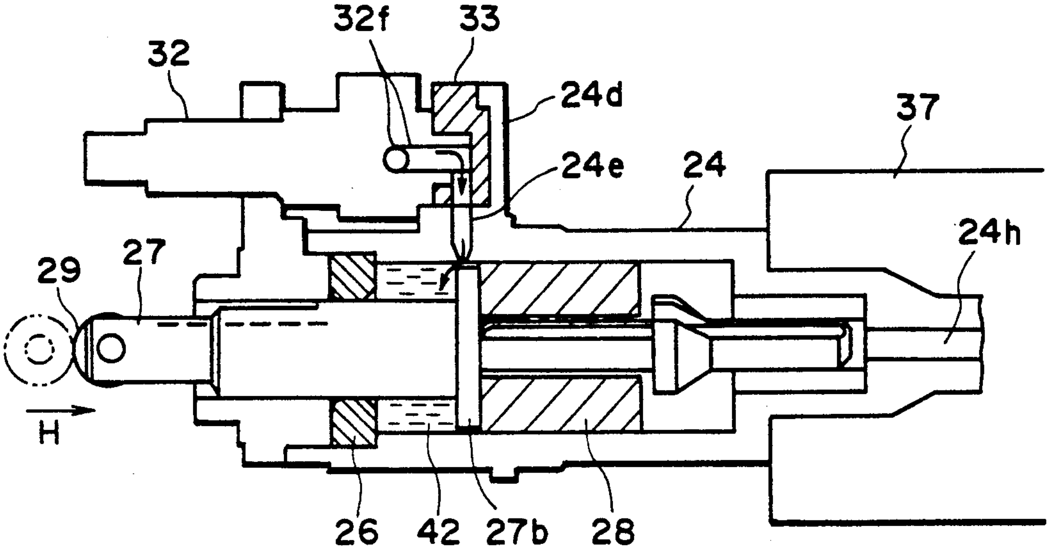
FIGS. 16A and 16B are side sectional views illustrating an operation of a pump for a recovery sucking operation.
Figure 16B:
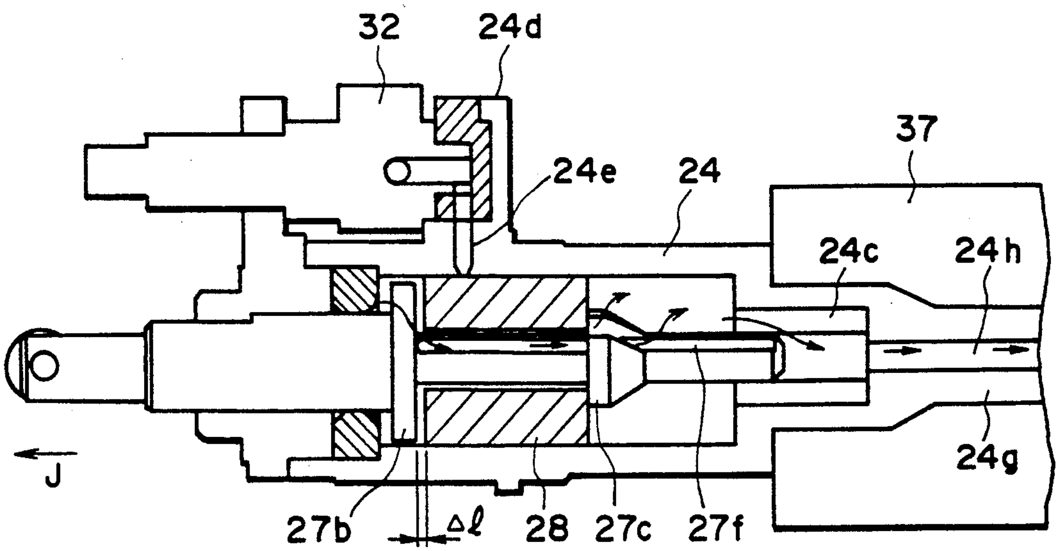

Referring to FIGS. 14A, 14B, 14C, 14D, 15A, 15B, 15C, 16A and 16B, and also referring to FIGS. 12A, 12B, 12C, 13A and 13B, the operation will be described. FIGS. 14A, 14B, 14C and 14D illustrate various operational states of the mechanism including the blade 17 or the like; FIGS. 15A, 15B and 15C illustrate sequential operational states of the mechanism including the cap 35; and FIGS. 16A and 16B illustrate operation of a mechanism for introducing the residual ink into a residual ink container 37 within the roller 36.

First, the carrier 6 moves to the home position in the direction indicated by an arrow B. At this time, as shown in FIG. 13A, the lead pin 7 is engaged with the lead groove 2a, and the ejection outlets 9c of the head element 9a are at a position facing to the ink carrier 19 (FIG. 14A). At this position, all of the energy generating elements of the head element 9a for producing the energy contributable to ejecting the ink are driven to eject the ink therethrough (preliminary ejection) by which the ink having a slightly increased viscosity or the like is ejected. Then, the recovery operation using the preliminary ejection is terminated. Also, the preliminary ejection may be effected at this position, periodically in order to prevent the viscosity of the ink from increasing adjacent such ejection outlets as are not used in the normal recording operation. FIG. 14A is a side view at this position.

As shown in FIG. 13B, when the rotation of the lead screw 2 moves the carrier 6 in the direction B, the clutch gear 4 is pushed by the urging portion 6a, so that the clutch gear 4 is moved in the same direction (B) to shift the start tooth 4c1 to a position for engagement with the start tooth 21b1 of the timing gear 21. Thereafter, the clutch gear 4 rotates in synchronism with the lead screw 2, by which the start teeth are engaged with each other, so that the timing gear 21 rotates in the direction D, as shown in FIG. 14B. On the other hand, the lead pin 7 is in the positioning groove 3b from the introduction groove 3c, and therefore, the carrier 6 does not move even if the lead screw 2 rotates.

When the timing gear 21 rotates in the direction B, the setting lever 20 starts to rotate in a direction E, since the gear of the timing gear 21 is meshed with the gear of the set lever 20. Until this point of time, the blade lever 16 has not been moved since the hook 16c of the blade lever 16 is engaged with a pawl of the base frame, and only the set lever 20 rotates. Sooner or later, the setting surface 20f of the setting lever 20 rotates in a direction F, while pushing down the rotatable member 18a of the blade shaft 18, and therefore, the blade 17 rotates in a direction G to be set into a state engageable to the ejection side surface.

When the timing gear 21 further rotates in the direction D, the hook 16c of the blade lever 16 is released from the pawl of the base frame 1, and the setting lever 20 and the blade lever 16 also rotate further. As shown in FIG. 14C, the blade 17 wipes the ejection side surface of the recording head element 9. The residual ink or the like removed by the blade 17 is directed only in one direction, that is, downwardly, in this embodiment. The ink liquid or the like thus removed is absorbed by or retained on the top portion of the ink carrier 19. At this time, the ink carrier 19 is started to contact the ink absorber 23. When the setting lever 20 rotates further, the ink carrier 19 and the blade 17 slide on the surface of the cleaner 23a of the ink absorber 23, by which the ink received by the ink carrier 19 during the preliminary ejection, the foreign matter removed by the blade 17 from the ejection outlet side surface or the like are received by the cleaner 23a, and in addition, the droplets of ink deposited on the ejection side surface can be absorbed. Accordingly, the ink absorbing power of the ink carrier 19 can be maintained for a long period of time.

The timing gear 21 rotates further in the direction D. Since, however, the stopping teeth 20a and 20b of the setting lever 20 are faced to and contacted to the stop cam 21a of the timing gear 21, the rotation of the setting lever 20 is stopped, and simultaneously, the driving teeth absent portion of the timing gear 21 is presented, and therefore, the rotating drive is not applied.

As described, since the absorber for retaining the ink or the like removed by the blade also functions as an ink receptor for the preliminary ejection, by which the size of the apparatus can be reduced, an also, the time required for the recovery operation can be reduced.

The timing gear 21 further rotates. Since the cap cam 21c of the timing gear 21 controls the rotational shaft 32a of the cap lever 32c shown in FIG. 8, at the initial stage, the cap 35 is at rest at a position away from the ejection side surface of the head element 9a, as shown in FIG. 15A. When the timing gear 21 further rotates in the direction D, the cap cam 21c is released, so that, as shown in FIG. 15B, the rotating lever 24f of the cylinder 24 is urged by the spring 22b of the ink absorbing spring 22. This rotates the cylinder 24 in the direction F. Then, the capping portion 35a of the cap 35 is brought into press-contact with the ejection side surface, thus accomplishing the capping operation. As will be understood, the capping portion 35a is brought into contact to the ejection side surface gradually from the bottom portion. By doing so, the air in the space between the capping portion 35a and the ejection side surface can be pushed out without pushing back the meniscus of the ink in the ink ejection passages of the recording head. FIG. 13B is a top plan view in this state. As will be understood, the urging force by the cap closely contact the sealing surface 32d to the cap seal portion 35d.

The foregoing is the cleaning and capping operation for the ejection side surface. Normally, the operation stops here, and in response to the subsequent production of the recording signal, the reverse operation is performed, and then the recording operation is started.

Then, the description will be made as to a sucking recovery operation which is performed when the good ejection is not accomplished even by the preliminary ejection.

When this is started, the timing gear 21 is further rotated from the capping position, by which the cap lever 32 is urged by the cap cam 21f to displace the cap 35 slightly away from the ejection side surface, as shown in FIG. 15C.

When the timing gear 21 rotates further in the direction D, it is released from the cap cam 21f, again, so that the capping portion 35a is press-contacted to the ejection side surface.

The pumping action will be described. When the recovery operation is started after the completion of the capping operation, the sucking operation is started.

The rotation of the timing gear 21 causes the piston setting cam 21g to push the piston urging roller 29 mounted on the piston shaft 27, by which the piston shaft 27 moves in a direction H, as shown in FIG. 16A. The piston 28 is pushed by the piston confining collar 27*b* and is moved in the direction H. Then, the groove 27*f* is closed, so that a level of vacuum is established in the pumping chamber 42. Since a skin layer is provided at the outer periphery of the piston 28 and at the contact surface with the piston confining collar 27*b,* the ink is prevented from leaking through the continuous pores of the foam material.

Since the ink passage 24*e* of the cylinder 24 is closed by the piston 28, the piston 28 is movable only to increase the vacuum of the pumping chamber 42. On the other hand, after the recapping operation described above, the ink passage 24*e* is opened, as shown in FIG. 16A, so that the ink is sucked from the head 9 through the sucking port 35*b* of the cap 35. The sucked ink flows through the ink passage 32*f* formed within the cap lever 32, the communicating whole of the lever seal 33 and through the ink passage 24*e* of the cylinder 24 into the pumping chamber 42.

With the continued rotation of the timing gear 21, the cap 35 is again slightly moved away from the ejection side surface of the recording head by the cap cam 21*h,* upon which the ink is sucked from the ejection side surface and from the inside of the cap 35*a* by the vacuum remaining in the pumping chamber 42 to remove the residual ink from these portions.

Then, the timing gear 21 is rotated in the reverse direction (opposite from the direction shown by the arrow in FIG. 14D), the piston resetting cam 21*i* pulls the piston resetting roller 30, by which, as shown in FIG. 16B, the piston shaft 27 is moved in a direction indicated by an arrow J. When this occurs, since the piston 28 moves only after it is contacted to the piston receiving portion 27*c* of the piston shaft 27, a clearance Δl is provided between an end surface 28*b* of the piston 28 and the piston confining collar 27*b.* Then, by the movement of the piston shaft 27 and the piston 28, the residual ink absorbed in the pumping chamber 42 is discharged to the neighborhood of a center of the residual ink absorbing material 37 through the above-described clearance Δl, the groove 27*f* of the piston shaft 27, the ink passage 24*c* of the cylinder 24, the ink passage 24*h* of the residual ink tube 24*b*. Here, the ink passage 24*e* of the cylinder 24 is closed by the piston 28 at the initial stage of the piston 28 operation, and therefore, the residual ink does not flow reversely toward the cap 35.

Figure 17:
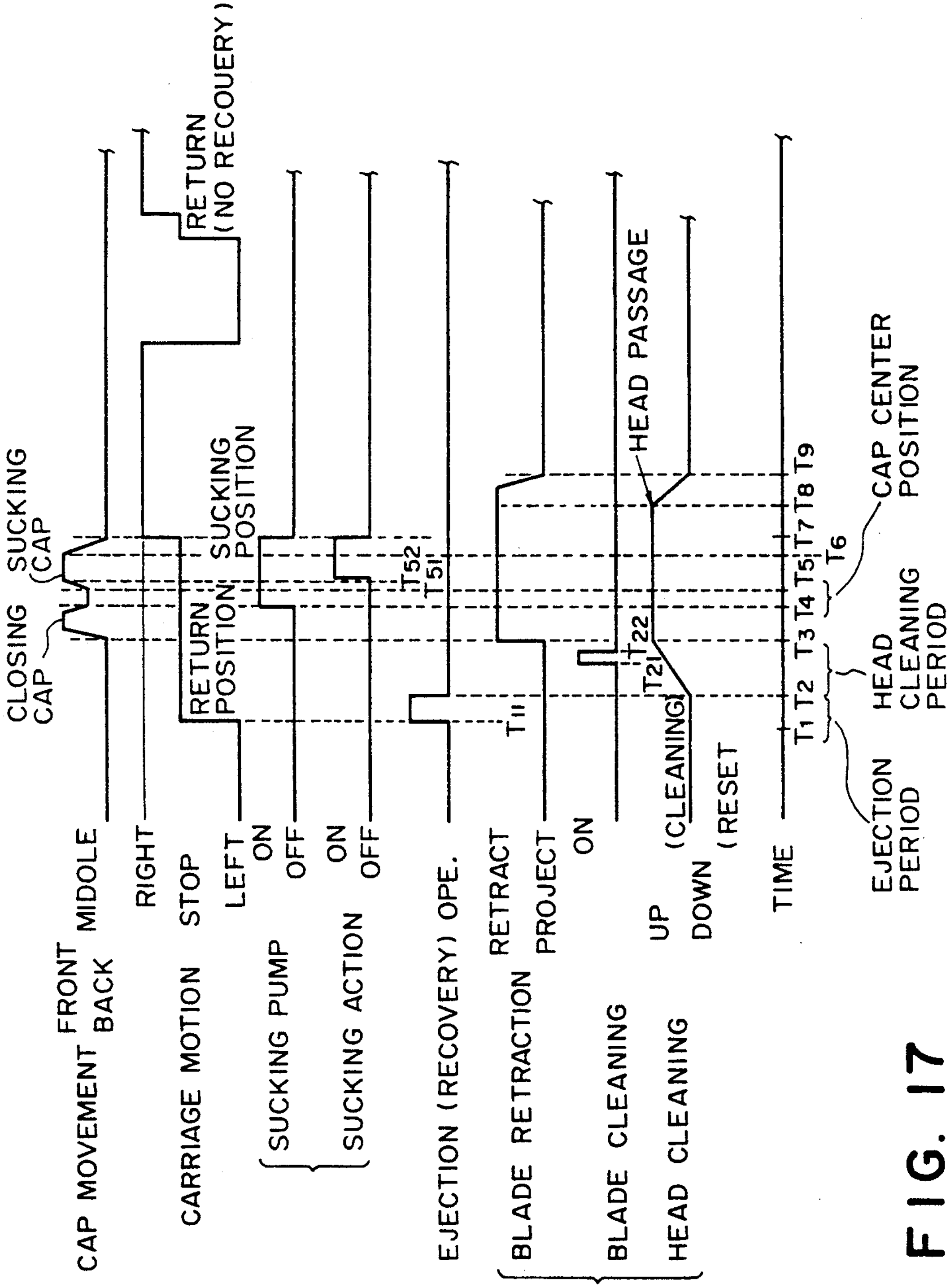
FIG. 17 is a timing chart illustrating sequential operations of a preliminary ejection operation or a sucking recovery operation in the apparatus of the embodiment and partly another embodiment.

FIG. 17 shows in summary the sequential operations for the preliminary ejection and the sucking recovery. However, the shown sequence is for the case in which the blade 17 is awaited in the operable state (setting state shown in FIG. 14B); then, the blade 17 becomes inclined with respect to the absorber 23 after the wiping operation (reset state shown in FIG. 14A); and thereafter, the blade 17 is set to the operative position immediately before the setting lever 20 restores its original position.

Figure 3A:
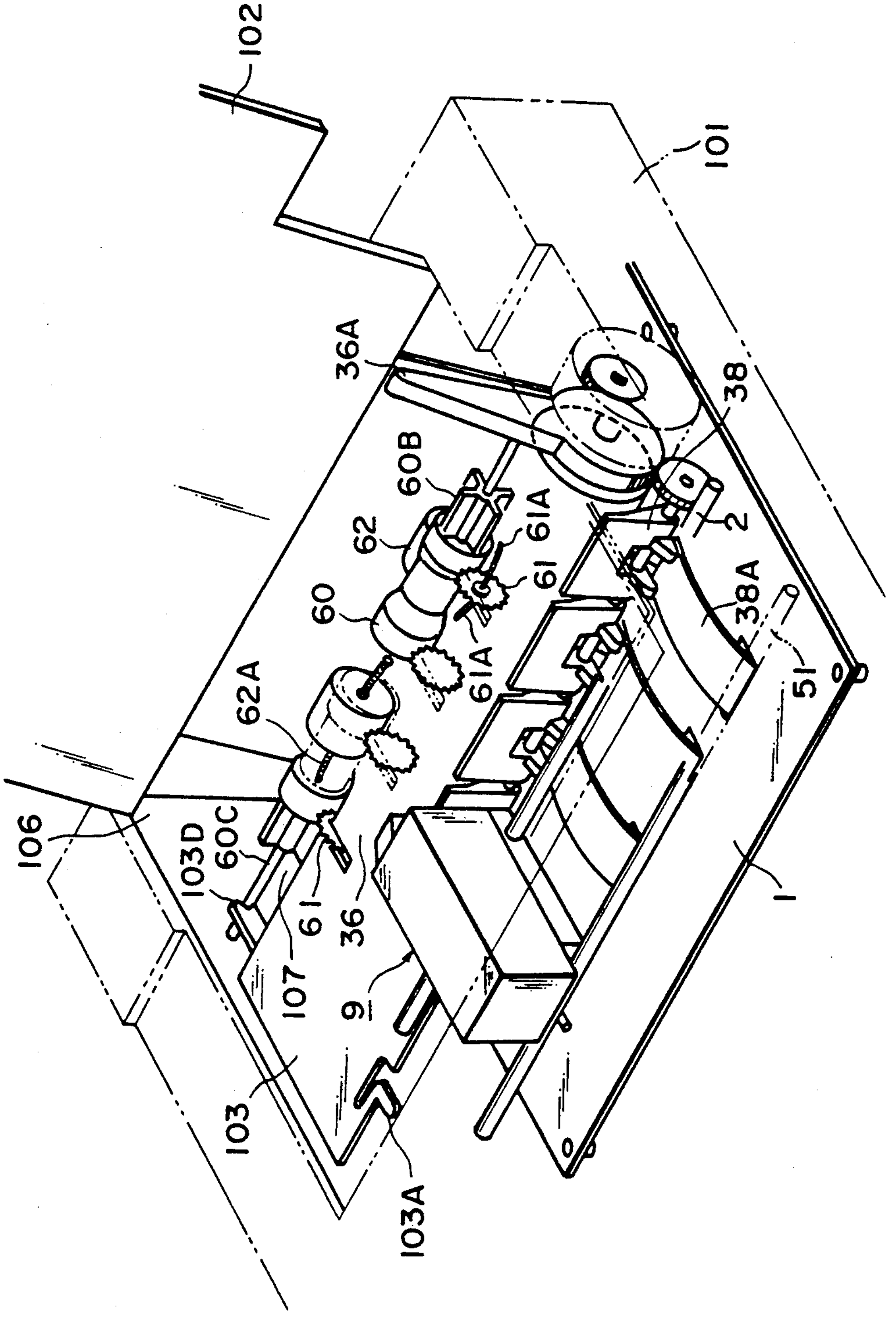
FIG. 3A is a perspective view of the apparatus of FIG. 1, illustrating a sheet discharging system.
Figure 3B:
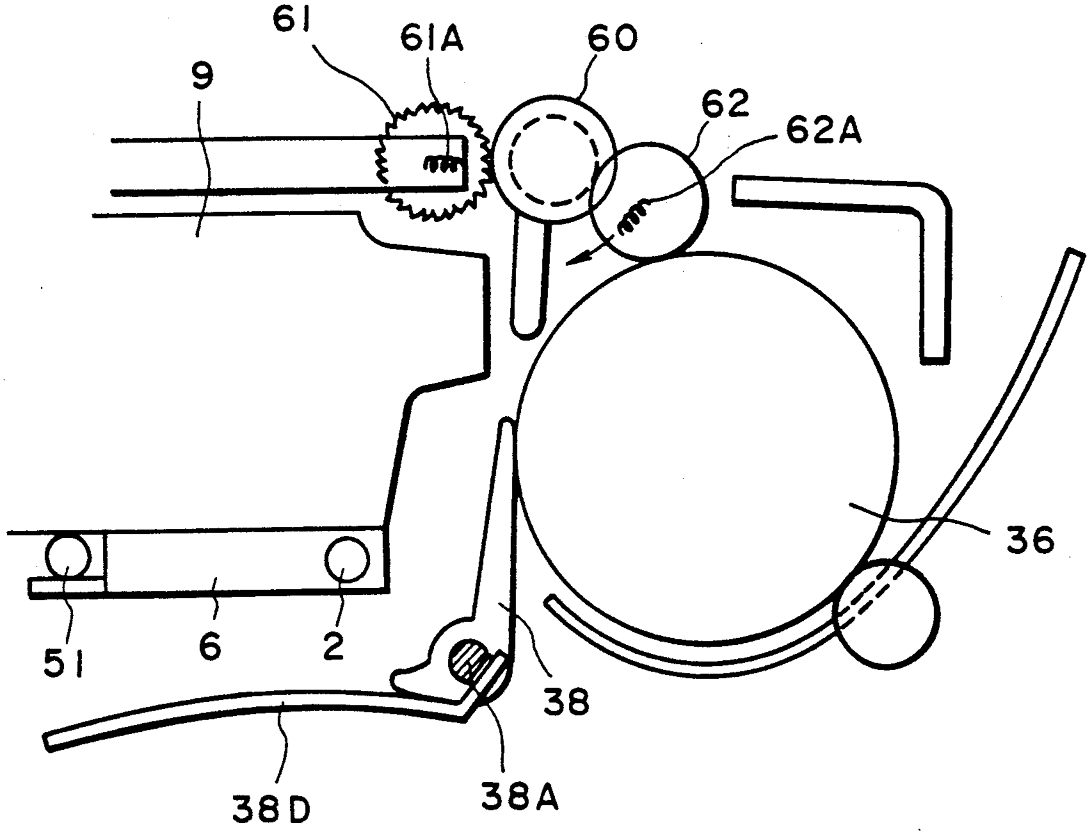
FIG. 3B is a side view of the sheet discharging system of FIG. 3A.

Referring to FIGS. 3A and 3B, the description will be made as to the recording medium feeding mechanism from the recording operation to the sheet discharge operation.

In these Figures, the sheet confining plate is made of fluorinated resin or a material in which carbon fibers are mixed. It urges the supplied recording sheet or paper to maintain a predetermined gap between the recording sheet and the ejection side surface of the recording head 9. The confining force of the sheet confining plates 38 is provided by the spring 38D. FIGS. 18A and 18B show details of the mechanism.

In FIG. 18A, the sheet confining plates 38 apply the confining force to the sheet feeding roller. A shaft 38A has a "D" shape (a part of its circumference is cutaway into a straight surface) and is in slidable relation with the sheet confining plates 38 in the rotational direction. In the state of this Figure, the straight portion of the shaft 38A is at such a position that it is contacted to the end 38F of the spring plate 38D. Therefore, the end 38E of the plate 38D is urged upwardly by the spring plate 38D. Accordingly, the confining plate 38 is urged to rotate in the clockwise direction about an axis of the shaft 38A to apply the confining force to the sheet feeding roller 36.

On the other hand, FIG. 18B shows the state wherein the urging force by the sheet confining plate 38 is released. When the shaft 38A rotates so that the arcuate portion of the shaft 38E urges the end 38F, the spring plate 38D is entirely urged downwardly, and therefore, the end 38E is not urged by the spring plate 38D.

In this released state, the shaft 38A and the sheet confining plate 38 are engaged with each other with a certain degree of friction, so that the sheet confining plate 38 is prevented from changing the rotational position to a large extent. Therefore, even when the necessity occurs to release the urging by the sheet confining plate 38, the movement of the recording head or the like is not obstructed by the sheet confining plate 38.

The sheet confining mechanism described above is capable of providing such urging force as not to prevent the proper conveyance of the recording sheet by the sheet feeding roller 36 within a limited space.

More particularly, the sheet confining plates themselves are not made of elastic material, and the urging force is provided by the leaf springs disposed on the bottom base frame 1 which is usually an empty space, and therefore, the latitude for the urging force adjustment accomplished by the adjustment of the length of the leaf spring is increased. In addition, the size of the sheet confining members can be reduced.

The leaf spring 38D is mounted on the base frame 1 by an unshown mounting member.

Referring back to FIGS. 3A and 3B, a sheet discharging roller functions to discharge the recording sheet having been subjected to the recording operation. Rowels 61 function to confine the recording sheet conveyed by the discharging roller 60 to confine the sheet discharge direction of the recording sheet and to provide conveying force therefor.

A transmission roller 62 is disposed between the sheet discharging roller 60 and the sheet feeding roller 36 to transmit the rotation of the sheet feeding roller 36 to the sheet discharging roller 60. The transmission of the rotation is effected by the friction force provided by the contact therebetween. The sheet discharging roller 60 is generally cylindrical, but the diameter at the opposite end portions thereof is different from that at the central portion. The transmission roller is contacted to the central portion of the discharging roller 60 which has the smaller diameter. Therefore, the opposite end portions having the large diameter and functioning to convey the recording sheet rotates at a larger peripheral speed than that of the sheet conveying roller 36. Thus, when the sheet is discharged, the recording sheet is slightly stretched, so that the recording surface can be maintained in good order.

The rotational shafts of the transmission roller 62 and the rowels 61 are made of coil spring having a proper elasticity coefficient. The mechanism will be described in detail, taking the rowel 61 as an example, referring to FIG. 19.

In FIG. 19, a shaft 61A is made of coil spring extending through the center of the rowels 61 at the opposite sides thereof, and is rotatably engaged with the rowels 61. Bearings 103B support opposite ends of shaft 61A, and are formed as a part of the inner cover 103 shown in FIG. 1. The bearings 103B support the shaft 61A for sliding movement in the longitudinal direction. Limiting members 104C limit movement of the rowel 61 in the direction of the rotational axis and in the direction perpendicular thereto. They are disposed at opposite sides of the rowel 61, and are formed as a part of the inner cover 103.

By the structure described above, the shaft 61A supports the rowels 61, and simultaneously, provides an urging force of the rowels 61 to the discharging rollers 60 by its resilient force.

The inner cover 103 has a spring 103A formed at the rear end thereof, as shown in FIG. 3A to receive an urging force toward the sheet discharging roller by reaction force from the case 101. By the cooperation between the urging force and the resilient force of the rotational shaft 61A, the rowels 61 provide proper urging force to the sheet discharging rollers 60.

Since the inner cover 103 receives the urging force, the engagement is assured between the fixing member 103D of the inner cover 103 and the rotational shaft 60C of the discharging rollers 60, as shown in FIG. 3A. As a result, the positional relation between the rowels 61 and the discharging roller 60 are maintained constant at all times. Alternatively, by abutting and fixing the rotational shaft 60C to a locking member or the like, the highly accurate relation can be maintained irrespective of the accuracy of the inner cover.

The function of the rotation shaft 62A made of coil spring is the same as in the transmission roller 62. More particularly, by the resilient force of the shaft 62A, the contact pressure to the sheet feeding roller 36 and the sheet discharging roller 60 is provided.

As described in the foregoing, the discharging roller 60 has a smaller diameter in the longitudinal central portion than in the opposite portions. This will be described in detail in conjunction with FIG. 20.

In FIG. 20, a cover member 60A is made of rubber material. A core member 60D is cylindrical, but the diameter at its opposite ends is larger than that at the center. The sheet discharging roller 60 is produced by covering the core member 60D with a cylindrical cover member 60A.

Therefore, it is not necessary to integrally form rubber material or the like into the shape, and therefore, the sheet discharging roller can be produced relatively easily and at lower cost.

A groove 60B continuously formed adjacent an end of the sheet discharging roller 60 is effective to lock an end portion of the recording sheet when the recording sheet is discharged by the discharging roller 60, so that the sheet discharging operation is assured even when the position of the recording sheet is deviated.

The configuration of the core member 60D is not limited to that described above. For example, it may be an extension of grooves 60B having a smaller central portion, if it is formed into a cylinder by covering it with rubber material.

Figure 21:
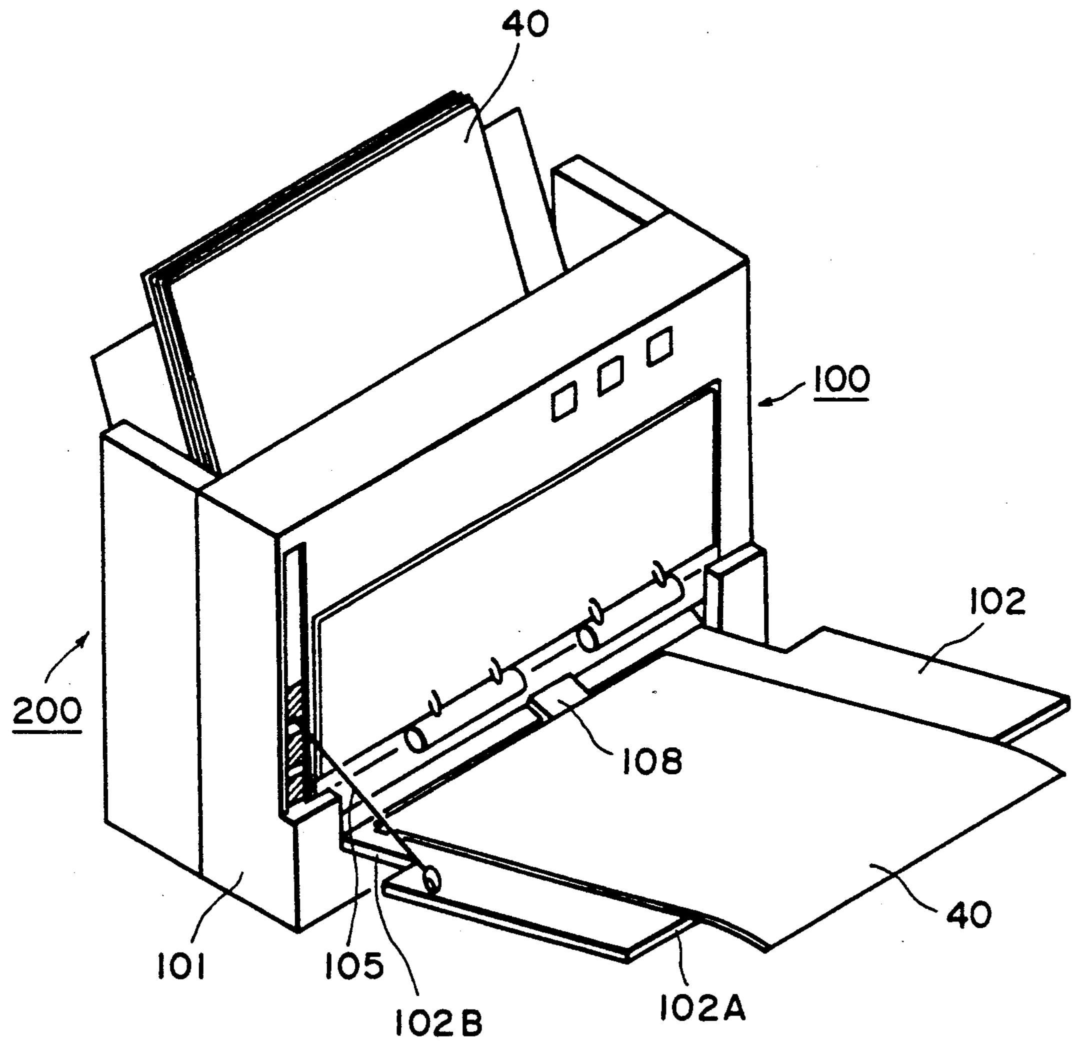
FIG. 21 is a perspective view of an apparatus according to the embodiment of the present invention, used in another position.
Figure 22:
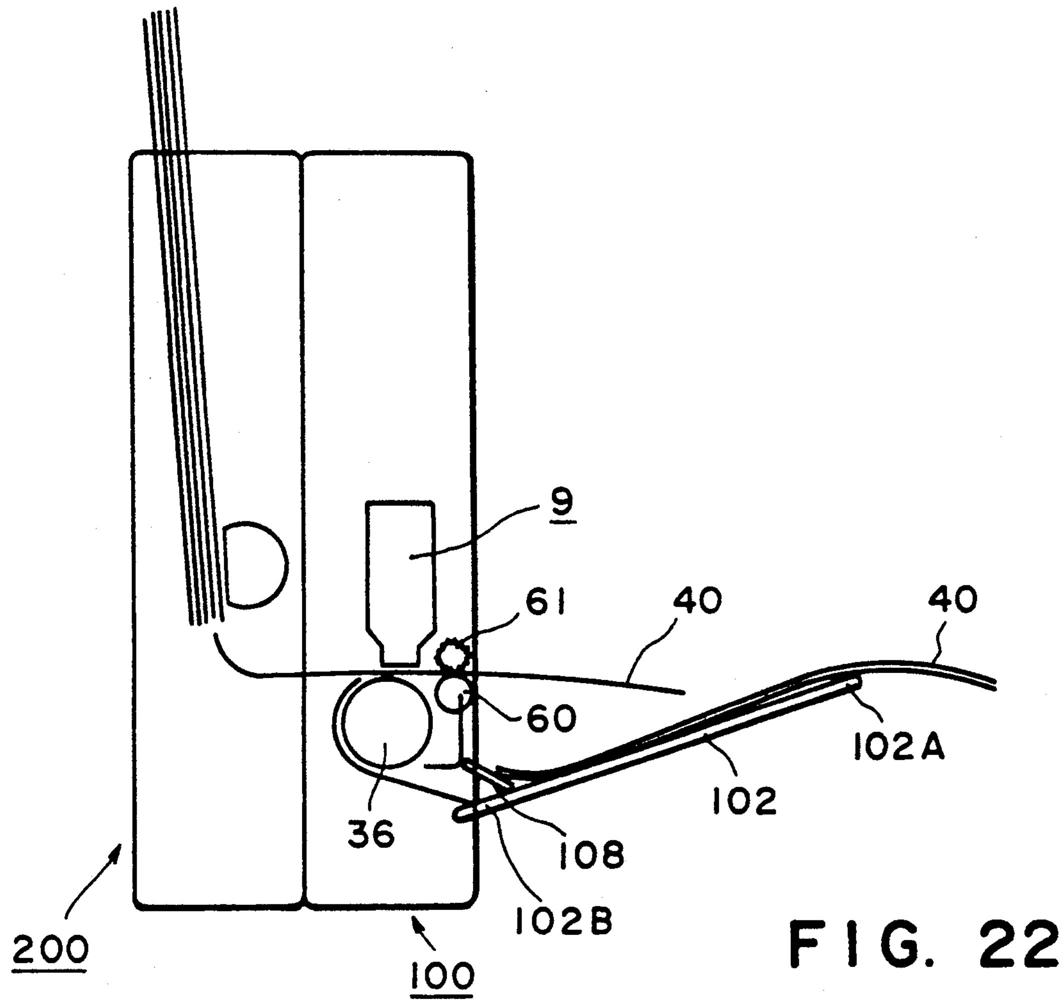
FIG. 22 is a side sectional view of the apparatus situated as shown in FIG. 21.

Referring to FIGS. 21 and 22, the description will be made as to the case in which the ink jet recording apparatus of this embodiment is vertically placed and operated.

When the apparatus is placed vertically, it can be used with an automatic cut sheet feeder 200 or can be used with a thick material such as envelope is supplied through a supply inlet at the backside of the apparatus.

When the normal recording sheets usable with the automatic feeder are used, the top cover 102 can be used as a stacking tray for the recording sheets. In this case, the top cover 102 is fixed at an angle which is different from the angle when the top cover 102 is used as a sheet guide for the supply sheet.

The use of the top cover 102 as the stacker will be considered.

The top cover 102 is situated in such a manner that the discharged recording sheet is conveyed in the air to a certain extent due to the rigidity thereof and is first contacted to the top cover 102 or the top of the stacked sheets, adjacent a top end 102A of the top cover 102. By doing so, the sheet being discharged slides on the topmost of the already stacked sheets only within a limited range, that is, in the neighborhood of the leading edge of the recording sheet. This minimizes the sliding movement of the recording sheet, so that the contamination of the recording sheet by the insufficiently fixed ink can be prevented.

To accomplish this, in this embodiment, the top end portion 102A is placed adjacent to the sheet discharging line, that is adjacent to the common tangent line between the sheet feeding roller 36 and the sheet discharging roller 60, and in addition, the bottom end portion 102B is lower than the top end portion 102A.

Additionally, the arrangement is such that when the trailing edge of the recording sheet stopped on the top end portion 102A is completedly discharged, the sheet falls at the position without slide on the stack.

To accomplish this, the length of the top cover 102 measured in the sheet discharge direction, that is, the length from the top end 102A to the bottom end 102B, is important. Where the recording sheet is a usual sheet, and where the sheet is discharged substantially horizontally, the length is 60–90%, preferably 70–80% of the length of the recording sheet.

If the structure of the recording apparatus is different, if the using conditions are different, or if the sheet discharging direction is different, the length of the stacking tray is determined in consideration of the above by one skilled in the art.

In FIGS. 21 and 22, designated by a reference numeral 108 is a tongue for preventing the stacked recording sheet is introduced into the sheet feeding inlet 106.

Referring to FIGS. 23–28, the recording head 9 and the carrier 6 will be described in detail.

Figure 23:
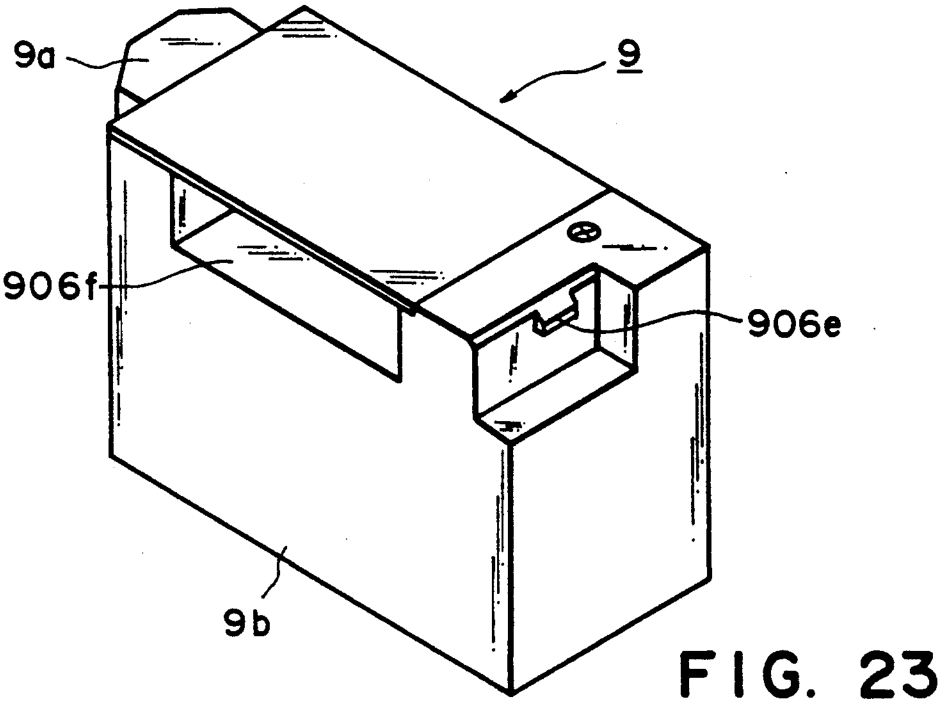
FIG. 23 is a perspective view illustrating an outer appearance of the recording head.

FIG. 23 is a perspective view showing an outer appearance of the recording head 9 comprising as a unit an ejection element **9*a* and an ink container 9*b*. A pawl 906*e* is engaged with a hook of a carrier when the recording head 9 is mounted on the carrier 6. As will be understood from the Figure, the pawl 906*e* is within an entire length, that is, within the length measured without the pawl 906*e*. Adjacent the ejection element 9*a* at the front side of the recording head 9, an abutment positioning portion is provided, although not shown in this Figure. An opening 906*f* is formed in the head for receiving a supporting plate which is projected from the carrier 6** to support a flexible substrate and a rubber pad.

Figures 24A, 24B:
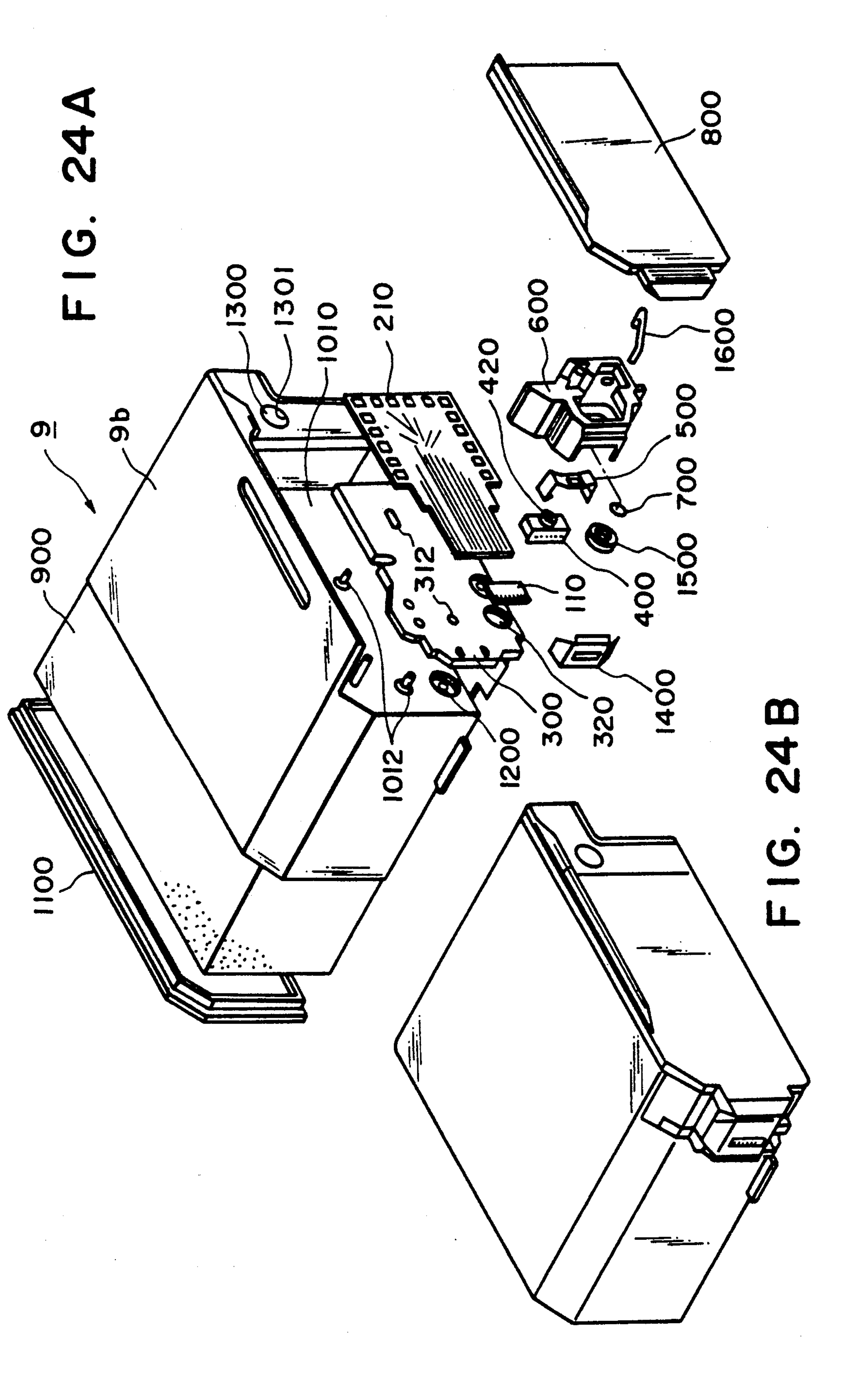
FIGS. 24A and 24B are an exploded perspective view and an outer appearance perspective view of a recording head, according to an embodiment of the present invention.

FIGS. 24A and 24B are an exploded perspective and an outer appearance perspective view of the ink jet recording head shown in FIG. 23. As described in the foregoing, it is a disposable type recording head having an integral ink container (ink supply source).

In FIG. 24A, designated by a reference numeral 110 is a heater board having a Si substrate, electrothermal transducer elements (ejection heaters) and aluminum or the like lead lines for supplying electric power thereto, wherein the transducer elements and the lead lines are produced by a thin film process. The heater board 110 is electrically connected with a wiring board 210, and the corresponding lines are connected by wire bonding.

The recording head is provided with a top plate 400 having partition walls for defining in passages and an ink chamber. In this embodiment, the top plate 400 is made of resin material having an integral orifice plate.

A supporting member 300 made of metal and a confining spring 500 are engaged with each other with the heater board 110 and the top plate 400 sandwiched therebetween, so that the heater board 100 and the top plate 400 are clamped by the urging force provided by the confining spring 500. To the supporting member 300, the wiring board 210 may be bonded, and the supporting member 300 may provide a positioning reference relative to the carrier 6. The supporting member 300 also functions as an element for irradiating the heat of the heater board 100 resulting from the driving of the electrothermal transducer. An ink supply chamber 600 receives ink from the ink container **9*b* (ink supply source), and functions as a subordinate container for supplying ink to the common chamber defined by bonding the top plate 400 to the heater board 110. A filter 700 is disposed in the supply chamber 600 adjacent the ink supply port to the common chamber. The supply chamber 600 is covered by a cover 800**.

The ink container **9*b* contains an ink absorbing material 900. An ink supply port 1200 supplies ink to the ejection unit 9*a*, having the various parts 110–800. Before the ejection unit 9*a* is mounted to the portion 1010 of the ink container 9*b*, the ink is injected through the supply port 1200, by which the ink is absorbed by the absorbing material 900**.

The cartridge has a cover 1100 which is provided with a hole 1301 for providing communication between the inside of the cartridge and the ambience. In the hole 1301, there is water repellent material, by which the ink is prevented from leaking through the hole 1301.

When the ink is filled in the ink container **9*b* through the supply port 1200, the ejection unit 9*a* comprising various elements 110–800 is positioned relative to the portion 1010. The correct positioning therebetween is accomplished by the projections 1012 of the ink container 9*b* and the corresponding openings 312 formed in the supporting member 300. Thus, the recording head 9 in the form of a cartridge as shown in FIG. 24*b*** is manufactured.

The ink is supplied to the supply chamber 600 from the inside of the cartridge through a supply port 1200, a hole 320 of the supporting member 300 and an inlet opening of the supply container 600 at the backside in FIG. 24A. From the supply chamber 600, the ink is supplied into the common chamber through a supply pipe and an ink inlet 420 of the top plate 400. In the connecting portions in the ink supply line, suitable gasket made of silicone rubber or butyl rubber or the like is mounted for the sealing to assure the ink supply.

Figure 25A:
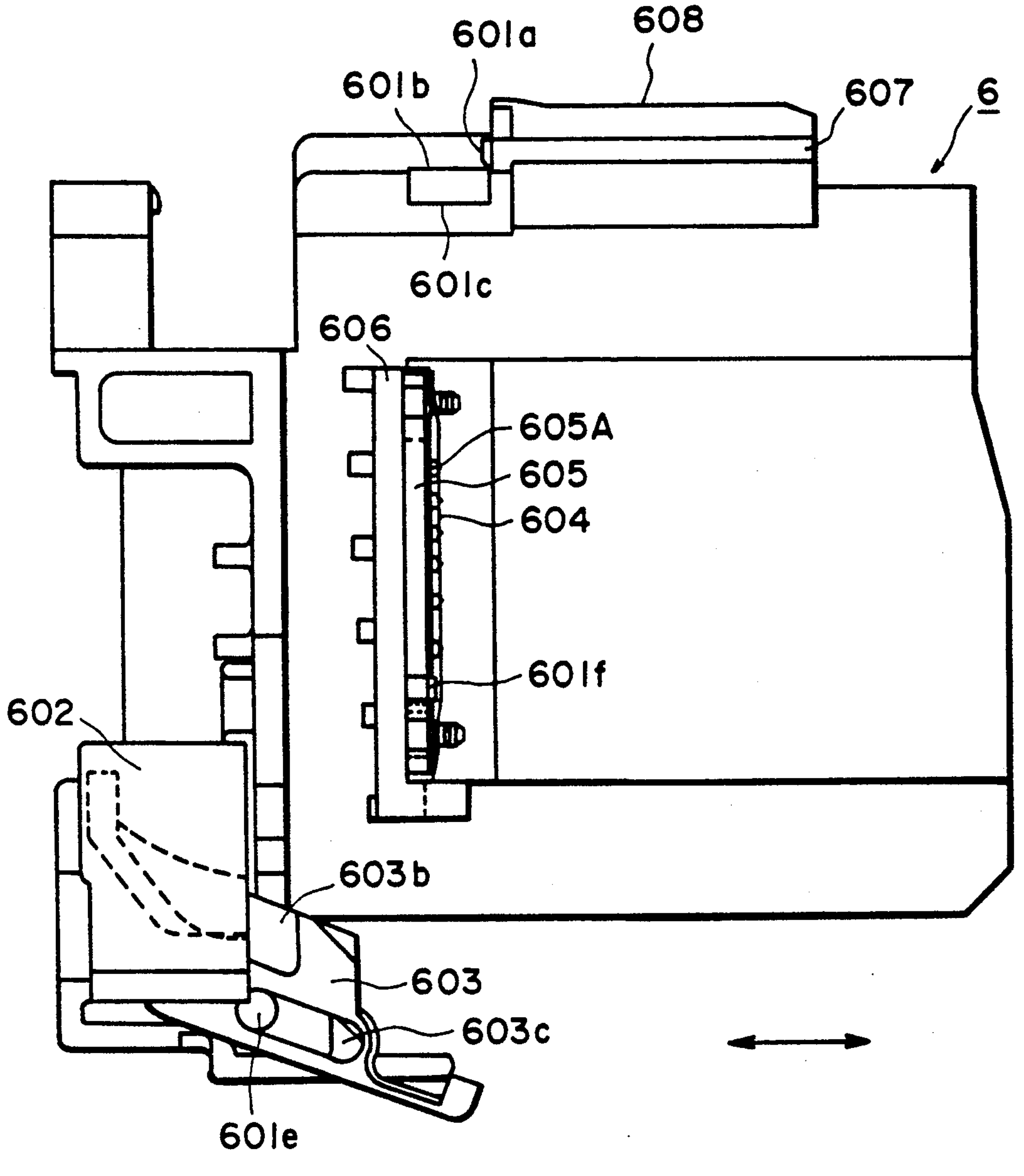
FIGS. 25A, 25B and 25C are a top plan view, a left side view and a right side view of a carrier (carriage) according to an embodiment of the present invention.
Figure 25B:
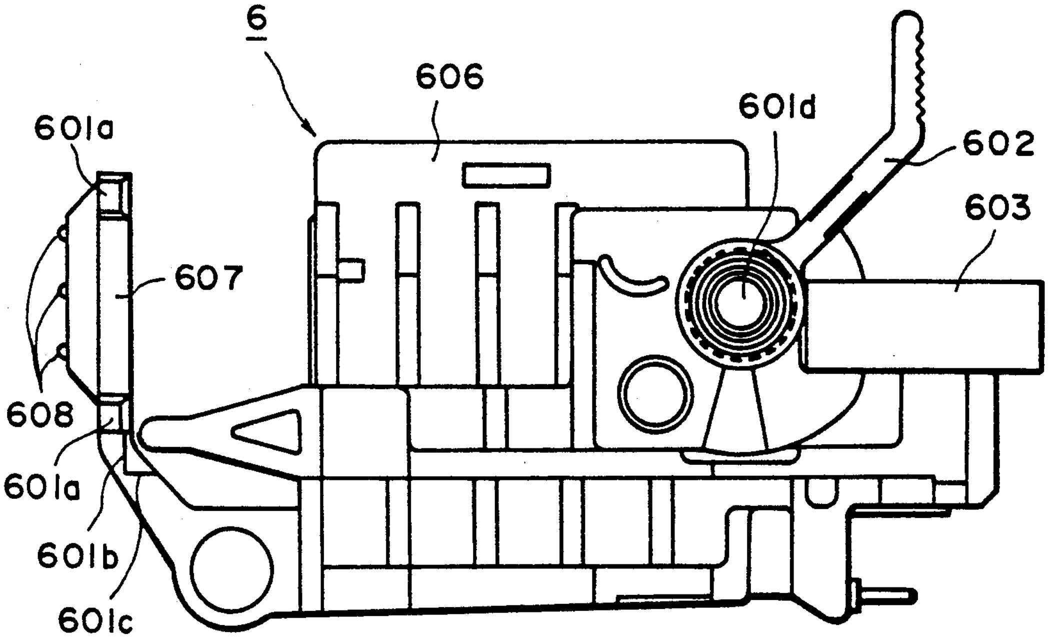
Figure 25C:
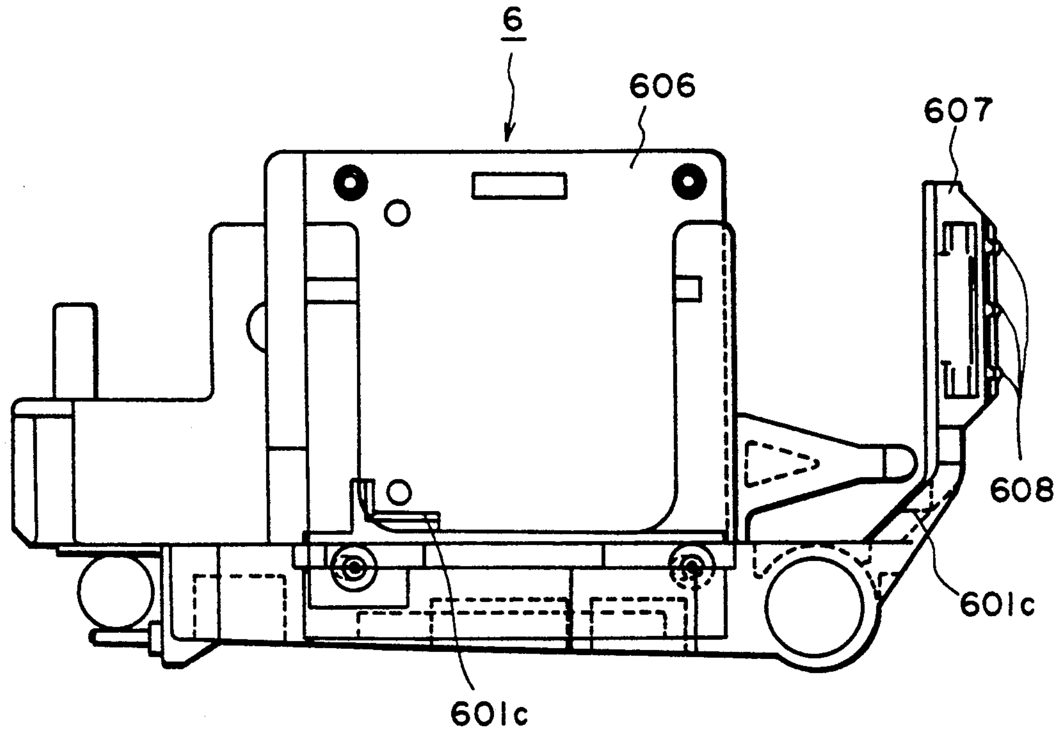

FIGS. 25A, 25B and 25C are a top plan view, a left side view and right side view of the carrier 6.

A supporting plate 606 is projected from the bottom of the carrier 6. It supports a flexible substrate 604, and a rubber pad 605 which has projections 605A corresponding to contact pads formed on the substrate 604.

An abutment member 607 is projected from the bottom of the carrier 6 adjacent its front end. The thickness of the abutment member 607 is desirably a small as possible in order to provide maximum volume for the ink container within the limited space on the carrier 6. Therefore, the member 607 has three ribs 608 to provide mechanical strength thereof. The ribs 608 extend in a direction of carrier 6 movement to provide a strength against the rotational direction upon the mounting or dismounting of the recording head relative to the carrier 6. In addition, the ribs 608 has a dimension such that it is approximately 0.1 mm beyond the ejection side surface when the recording head 9 is mounted. By doing so, the recording sheet is prevented from rubbing the ejection side surface, and therefore, from damaging the ejection side surface, even if the recording sheet is present in the recording head moving path for some reason or another.

A contact lever 602 is operated when the recording head is mounted on or dismounted from the carrier 6. It is rotatably supported on a shaft **601*d* of the carrier 6. A contact hook 603 is partly contactable to the recording head 9 for the mounting and dismounting of the recording head 9 by operation in engagement with a part of the contact lever 602. The hook 603 has an elongated slot 603*c* which is guided by a guide pin 601*e* mounted on the carrier 6** in the mounting and dismounting operation.

The mounting and dismounting mechanism including the contact lever 602, the contact hook 603 or the like is disposed at a side of the carrier 6, that is, at a side in the carrier 6 movement direction, and therefore, the mechanism does not require a large dead space to permit movement of the carrier.

The description will be made as to the abutment portions for the positioning of the recording head. The abutment portions 601A are effective to the positioning in the left-right direction, and two of them are at a side of the abutment member 607. As for the left-right direction positioning, an abutment portion **601*f* on the supporting plate 606 is used in addition to the abutment portions 601*a***.

An abutment portion **601*b* is formed at a side and bottom portion of the abutment member 607** to position the recording head in a front-rear direction.

The abutment portions **601*c* are for the positioning in the vertical direction, and two of them are formed at a side and bottom of the abutment member 607** and at a side bottom portion of the supporting plate, respectively.

Figure 26A:
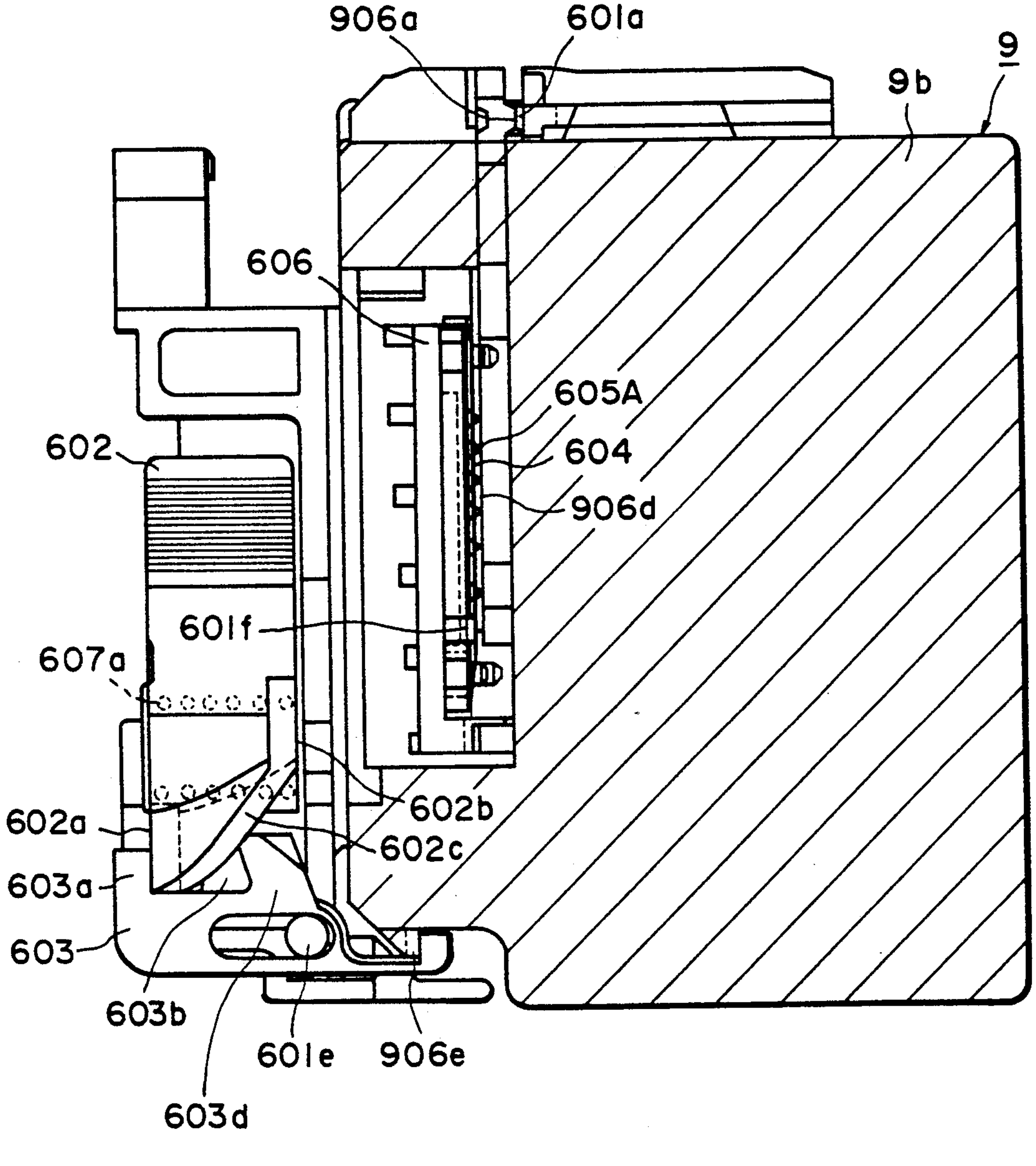
FIGS. 26A and 26B are a top plan view and a right side view of the carrier shown in FIGS. 25A, 25B and 25C, when it carries the recording head.
Figure 26B:
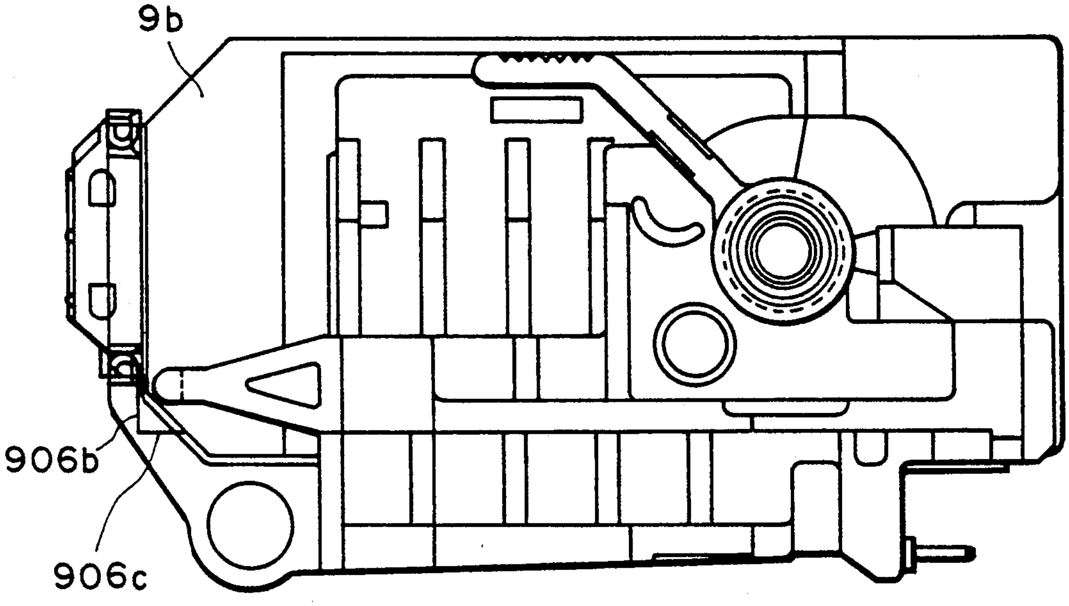

FIGS. 26A and 26B are top plan view and a side view when the recording head 9 is mounted on the carrier 6.

An abutment portion **906*a* is formed on the recording head 9 for the abutment to the carrier 6, and the abutment portions 906*b* and 906*c* corresponds to the abutment portions 601*b* and 601*c***, respectively.

Referring to FIG. 26A, the engagements in the various portions will be described when the recording head is mounted on the carrier.

The abutment portion **906*a* of the recording head 9 abuts the abutment portion 601*a* of the carrier 6, and simultaneously, the pawl 906*e* of the recording head 9 is urged toward left in the Figure by the urging force of the coil spring 607***a* through the hook 603 engaged therewith. Thus, the recording head 9 receives a moment about the abutment portion. At this time, the substrate 906*d* of the recording head is abutted to the abutment portion 601*f*, by which the recording head 9 is correctly positioned in the left-right direction, and the position is retained.

Also, at this time, the projections 605A of the rubber pad 605 are compressed and deformed by the abutment with the substrate 906*d*. By the deformation, press-contact force is produced between the contact pads of the flexible substrate 604 and the contacts of the board 906*d*. In this case, since the substrate 906*d* is contacted to the abutment portions 601*f*, the amount of deformation of the projections 605A is constant, so that the press-contact force is stable.

In the Figure, the compressed and deformed state of the projections 605A is not shown.

As will be described hereinafter, the positioning of the recording head 9 in the front-rear direction and the vertical direction has already been accomplished during the mounting process.

Figure 27:
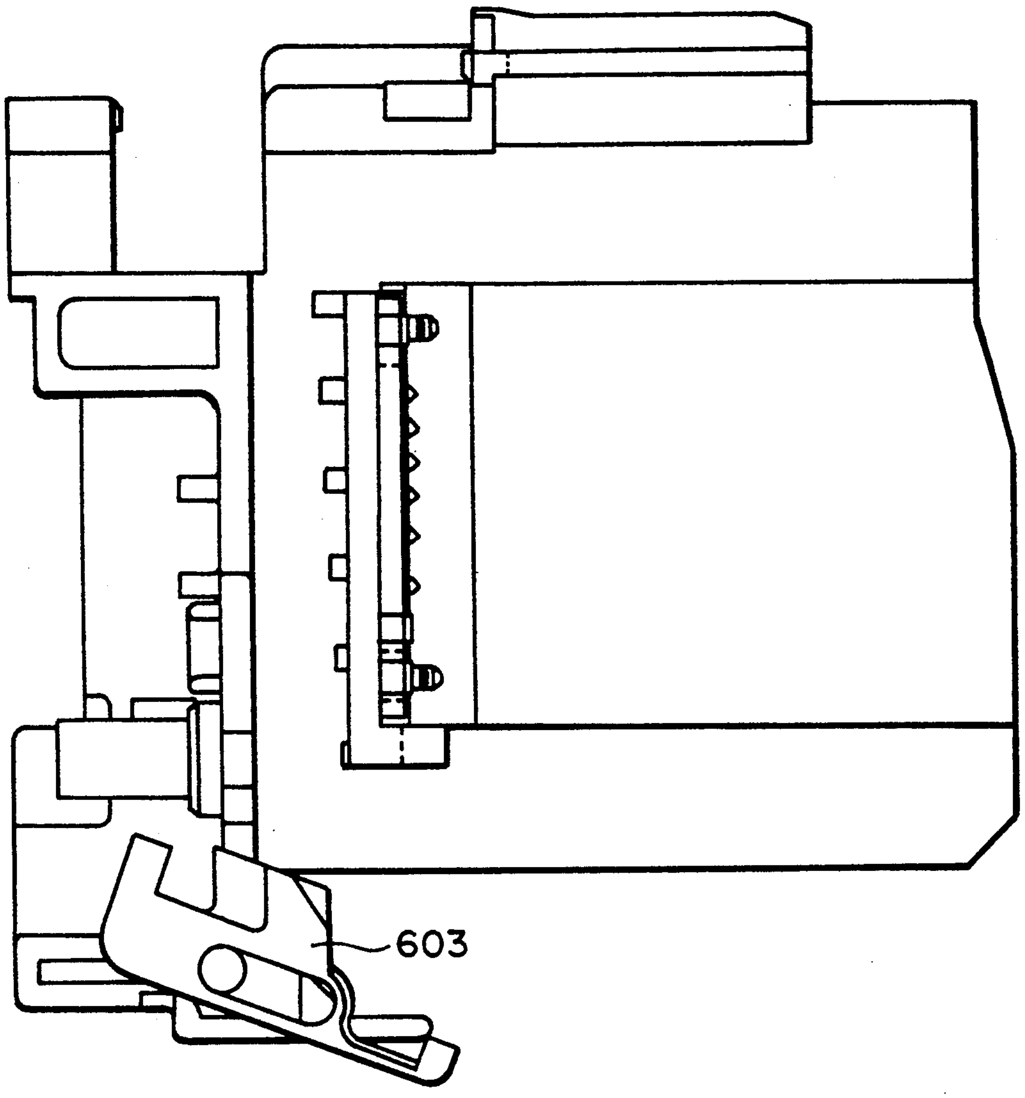
FIG. 27 is a top plan view of the carrier before the recording head is mounted thereon.

FIG. 27 is a top plan view of the carrier 6 before the recording head is mounted, the contact lever 602 being omitted in this Figure for sake of simplicity.

In the state shown in this Figure, the contact lever 602 is retracted (toward rear) (FIG. 25B), and at this time, the position of the contact hook is as shown in FIG. 27. The carrier waits for the recording head 9 to be mounted with this position.

Figure 28A:
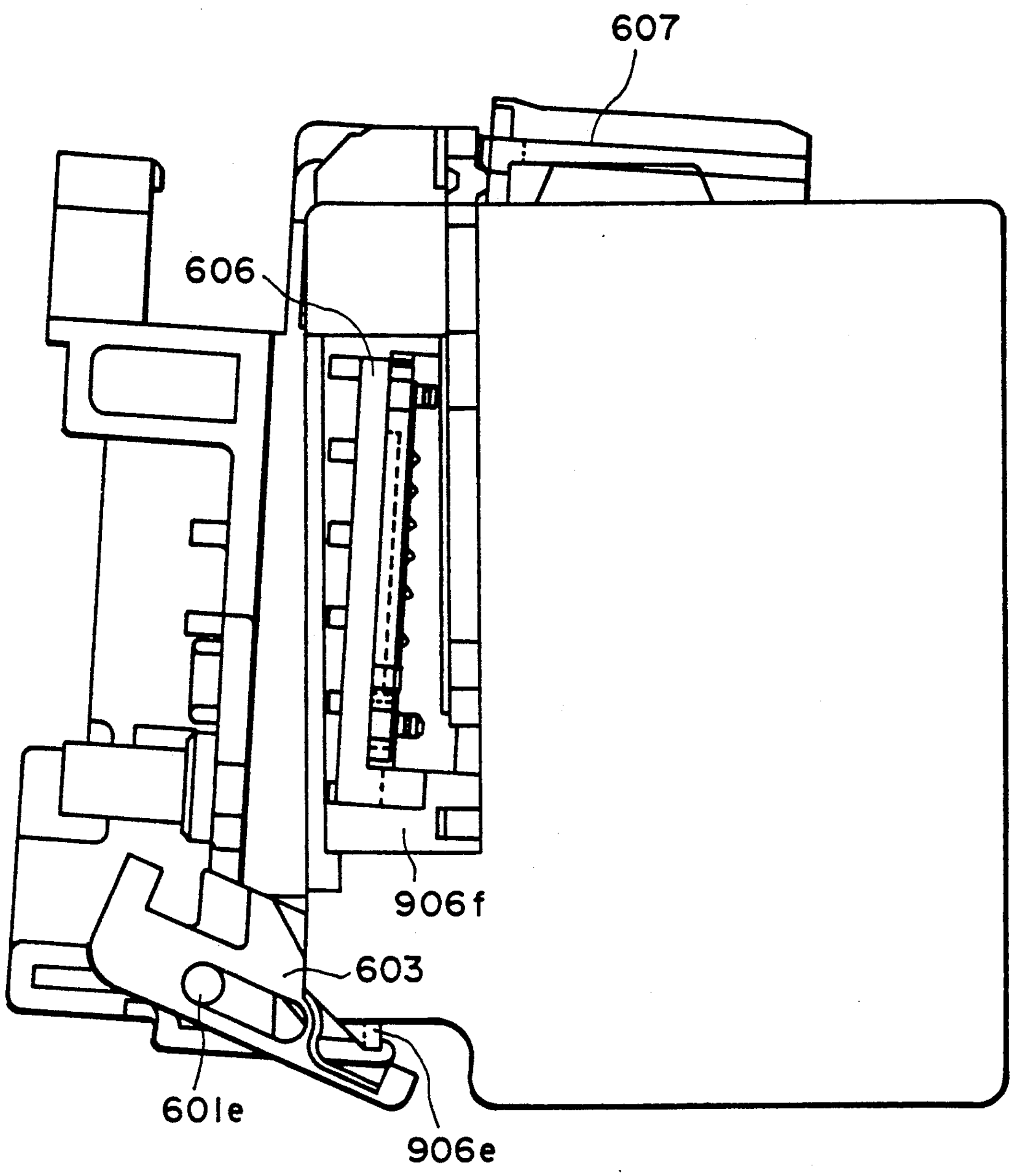
FIGS. 28A, 28B and 28C are top plan views of the carrier when the recording head is being mounted thereon.
Figure 28B:
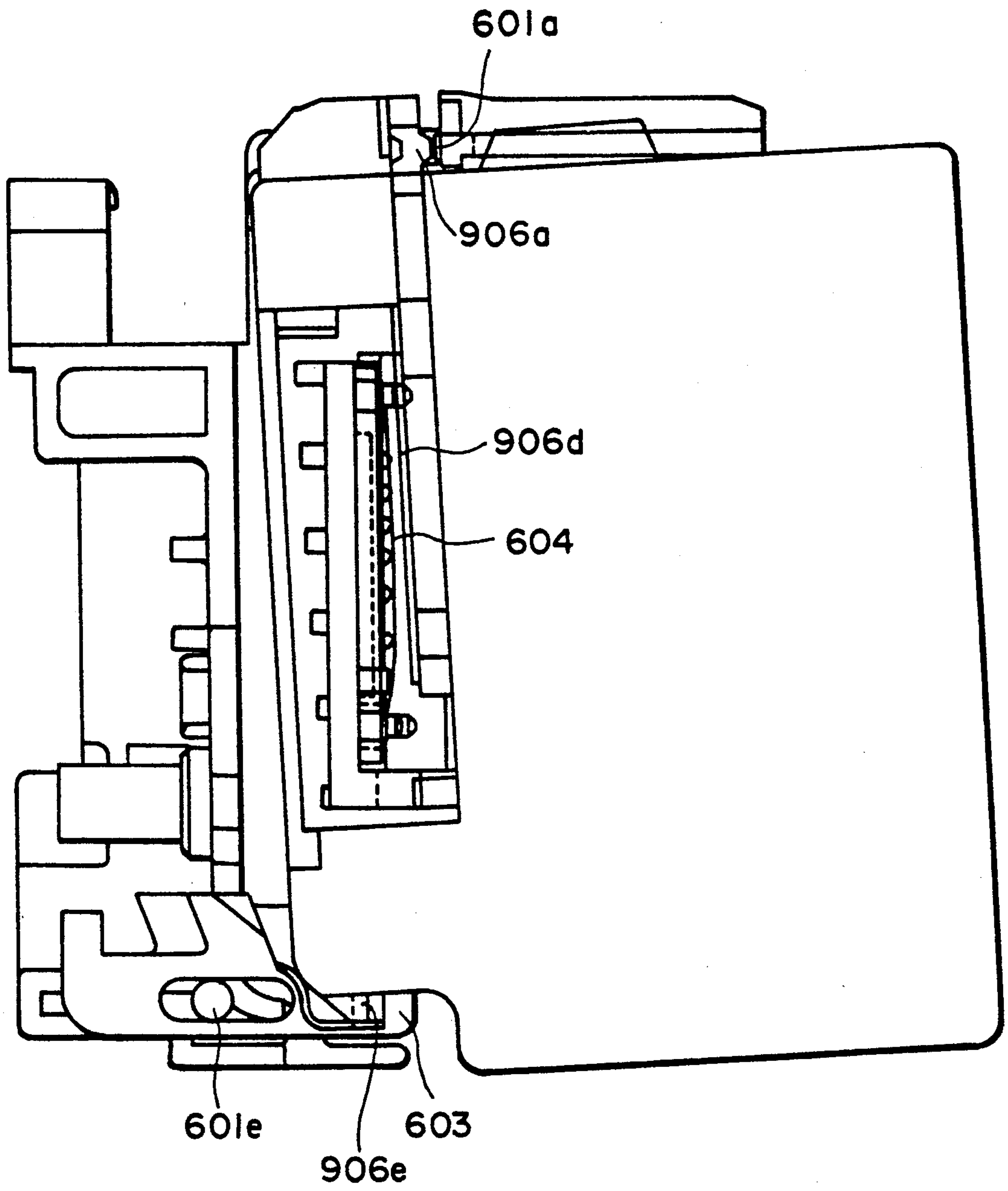
Figure 28C:
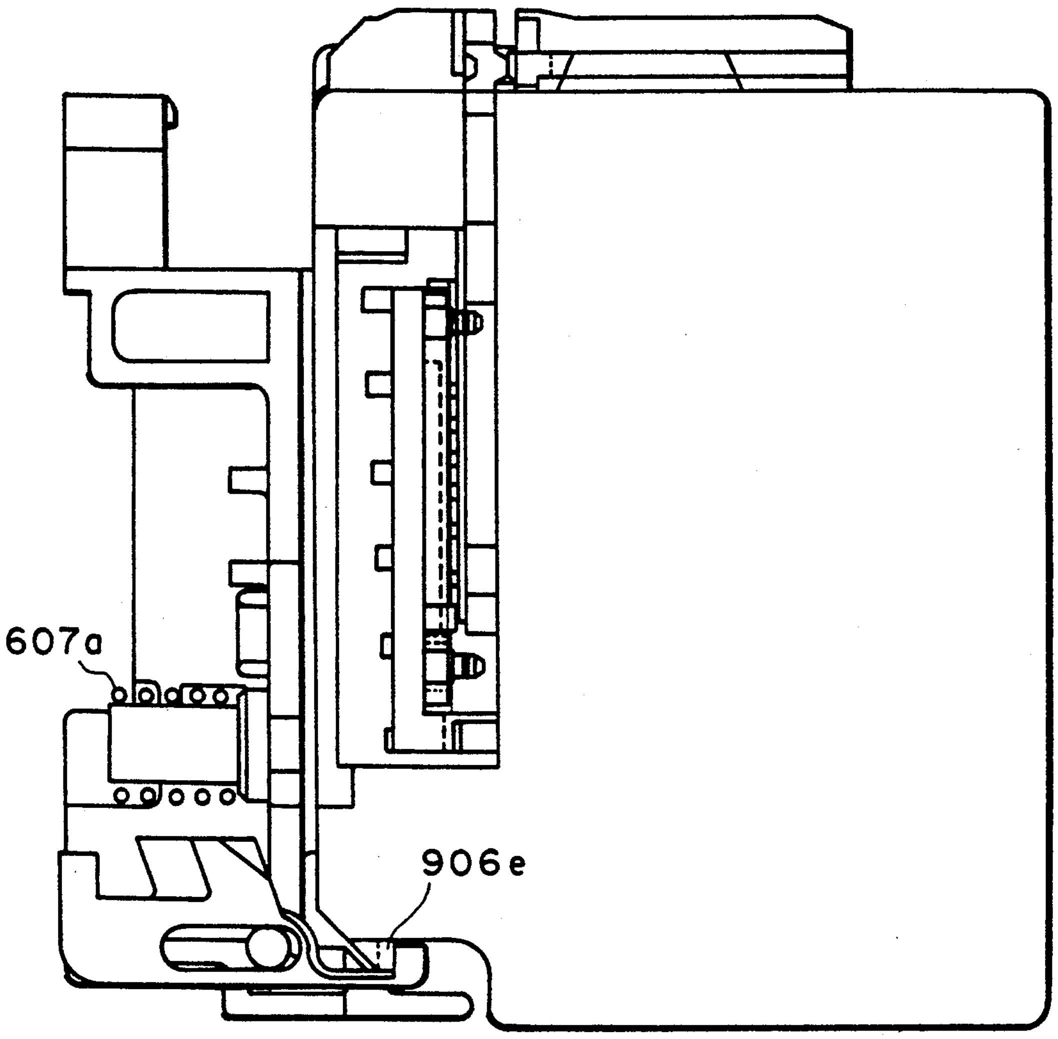

FIGS. 28A, 28B and 28C are top plan views showing the process of the recording head being mounted. The recording head 9 is moved close to the carrier 6 from above the carrier 6 so that the opening 906*f* receives the supporting plate 606. At this time, as shown in FIG. 28A, the recording head 9 is mounted on the carrier 6 with inclination because of the positional relationship among the abutment member 607, the supporting plate 606 and the contact hook 603 and because of the relation between the total length of the recording head 9 and the opening 906*f*.

When the contact lever 602 is rotated in the counterclockwise direction (FIG. 25B), the contact hook 603 rotates in the counterclockwise direction about the shaft 601*e*, and thereafter, when it becomes horizontal, it moves toward left into the state shown in FIG. 28B.

In compliance with this movement of the contact hook 603, the recording head 9 is urged upper left part in this Figure by the engagement with the contact hook 603. Then, the abutment portion 906*a* of the recording head slides to become on the abutment portion 601*a*, and the contact portion 906*b* is abutted to the abutment portion 601*b*. In this state, the substrate 906*d* and the flexible substrate 604 are not contacted.

With the further counterclockwise rotation of the contact lever 602, the contact hook 603 is moved further leftwardly. During this, it moves the engaging pawl 906*c*, and therefore, the recording head 9 rotates in the clockwise direction about the abutment between the abutment portions 906*a* and 906*b* into the state shown in FIG. 28C, by which the position of the recording head 9 on the carrier 6 is determined.

The front-rear and vertical positions are determined during the process of the mounting.

In the state shown in FIG. 28C, the contact lever 602 is urged toward left by the coil spring 607*a* in the inside of the rotational shaft, as described hereinbefore, and the urging force is effective to fix the recording head 9 onto the carrier 6 through the contact hook 603.

As will be understood from the foregoing, the mounting of the recording head in this embodiment includes a translational movement and a rotational movement of the recording head, and the angle of rotation is approximately 5 degrees.

Since the recording head is mounted with the small rotational angle, no particular space is required for the mounting of the recording head.

Referring to FIGS. 25A and 26A, the relationship will be described between the contact lever and the contact hook.

As shown in these Figures, the contact lever 602 is provided with two flat surfaces 602*a* and 602*b* and a single slanted surface (cam surface) 602*c*. When the recording head 9 is fixed (FIG. 28C), the surface 602A is engaged to a portion 603*a* of the contact hook 603 to apply an urging force to the hook 603.

The relationship between the lever 602 and the hook 603 during the recording head dismounting process will be described. The contact lever 602 is rotated from the state shown in FIG. 26A in a direction opposite from that in the mounting process, the cam surface 602*c* of the contact lever rotates in contact with the cam surface 603*b* of the contact hook. Then, the contact hook 603 moves toward the right until the left end of the elongate slot 603*c* abuts the shaft 601*c* of the carrier 6. Thereafter, it rotates in the clockwise direction about the shaft 601*c*. When the abutment surface of the contact lever 602 reaches the flat surface 602*b*, it abuts an end of the cam surface 603*b* of the contact hook 103, so that the state shown in FIG. 25A is reached.

In the process from the state of FIG. 26A to the state of FIG. 25A, the recording head 9 is pushed out by the portion 603*d* of the contact hook.

The present invention is particularly suitable for use with a bubble jet recording head and a bubble jet recording apparatus proposed by Canon Kabushiki Kaisha, Japan.

Preferably, the recording head and the apparatus is of the type disclosed in U.S. Pat. Nos. 4,723,129 and 4,740,796 which disclose a typical structure and the operational principle. The structure and the principle are applicable to a so-called on-demand type recording system and a so-called continuous type recording system. Particularly, however, the bubble jet structure and principle are suitable for the on-demand type because the principle is, in brief, such that at least one driving signal is applied to an electrothermal transducer disposed on a liquid (ink) retaining sheet or passage, the driving signal being enough to provide such a quick temperature rise beyond a departure from nucleation boiling point, by which the thermal energy is provided to produce the film boiling at the heating portion of the recording head, upon which a bubble can be formed in response to the driving signal. By the development and contraction of the bubble, the liquid is ejected through an ejection outlet to produce at least one droplet. The driving signal is preferably in the form of a pulse, because the development and contraction of the bubble can occur instantaneously, and therefore, the liquid is ejected with quick response. The driving signal in the form of a pulse is preferably such as disclosed in U.S. Pat. Nos. 4,463,359 and 4,345,262. In addition, the temperature increasing rate of the heating surface is preferably as disclosed in U.S. Pat. No. 4,313,124.

The structure of the recording head may comprise the combination of the ejection outlet, the liquid passage and the electrothermal transducer as disclosed in the above mentioned U.S. Patents (linear liquid passage or rectangular liquid passage), or may be the one disclosed in U.S. Pat. Nos. 4,558,333 and 4,459,600 wherein the heating portion is disposed at a bent portion. The present invention is also applicable to the structure disclosed in Japanese Laid-Open Patent Application No. 123670/1984 wherein a common slit is used as the ejection outlets for plural electrothermal transducers, and also to the structure disclosed in Japanese Laid-Open Patent Application No. 138461/1984 wherein an opening for absorbing pressure wave of the thermal energy is formed corresponding to the ejecting portion.

The present invention is effectively applicable to a so-called full-line type recording head having a length covering the maximum recording width. Such a recording head may comprise a long single recording head or a plural recording heads combined to cover the entire width.

The present invention is also effectively applicable to a recording head in the form of an exchangeable chip which is electrically connected with and supplied with ink from the main assembly of the recording apparatus when mounted on the main assembly, or in the form of a cartridge type recording head integrally mounted.

The provision of the recovery means or the auxiliary means for the preliminary operation is preferable, because it can further stabilize the advantageous effects of the present invention. As for examples of such means, there are capping means for capping the recording head, cleaning means for cleaning the recording head, pressure applying means or sucking means for applying pressure to or sucking the liquid in the passage, preliminary heating means using the ejecting electrothermal transducers or by a combination of the ejecting thermal transducer and additional heating means, and means for effecting preliminary ejection of the liquid not for the recording operation. They can stabilize the recording operation.

As regards the recording mode of the recording apparatus, it is not limited to the record only by a main color such as black. The present invention is effectively applicable to a recording apparatus having an integral recording head or a combination of plural recording heads for the recording operation at least one of the multi-color mode using different colors and a full-color mode using color mixture.

In the foregoing embodiment, the ink has been described as liquid. However, it may be an ink material which is solid at the room temperature or an ink material which is softened at the room temperature. Since in the ink jet recording system, the ink is usually controlled within the temperature not lower than 30° C. and not higher than 70° C. to stabilize the viscosity of the ink to stabilize the ejection, the ink may be such that it is liquid when the recording signal is applied in use. The present invention is applicable to the ink which is liquefied by application of the thermal energy thereto. In an example of such a type, the thermal energy is positively consumed for the phase change from the solid state to the liquid state so as to suppress the temperature rise by the thermal energy. In another example, the ink which is solidified when left as it is, for the purpose of preventing the evaporation. In these examples, the ink is liquefied by the application of the thermal energy thereto in response to the recording signal, and the liquefied ink is ejected. In one example, the ink already starts to be solidified when reaching the recording medium. Such an ink material may be retained as liquid or solid ink in holes or recesses formed in a porous sheet as disclosed in Japanese Laid-Open Patent Application Nos. 56847/1989 and 71260/1985. In this case, the sheet is faced to the electrothermal transducers.

The most effective actuation of the above-described ink is to cause film boiling thereof.

While the invention has been described with reference to the structures disclosed herein, it is not confined to the details set forth and this application is intended to cover such modifications or changes as may come within the purposes of the improvements or the scope of the following claims.

What is claimed is:

1. A carriage, movable along a predetermined path, for detachably mounting thereon an ink jet recording head, comprising:

a first abutment portion for positioning the recording head in a horizontal direction;

an engageable member, disposed at a side of said carriage and substantially parallel to a movement direction of said carriage, for engaging the recording head, said engageable member being rotatable and slidable;

an operating lever, disposed substantially entirely adjacent to a side of said carriage substantially perpendicular to the movement direction of said carriage, said operating lever being rotatable in a direction crossing with plane of movement of said carriage, wherein said operating lever causes said engageable member to engage and move the recording head such that the recording head abuts said first abutment portion and rotates about said first abutment portion;

a second abutment portion for abutting the recording head during rotation to stop the rotational movement of the recording head; and urging means for urging the recording head toward said second abutment portion, wherein the recording head is mounted on said carriage by moving said operating lever in one direction and is dismounted from said carriage by moving said operating lever in opposite direction.

2. A carriage according to claim 1, further comprising an ink jet recording head detachably mountable on said carriage.

3. A carriage according to claim 2, wherein ink is ejected from said ink jet recording head by heat produced by an electrothermal transducer element.

4. A carriage, movable along a predetermined path, for detachably mounting thereon an ink jet recording head, comprising:

a hook movable in rotational and slidable motions, wherein said hook engages the recording head during the rotational and slidable motions; and an operating lever disposed substantially entirely adjacent to a side of said carriage substantially perpendicular to a movement direction of said carriage, said operating lever being rotatable in a direction crossing with a plane of movement of said carriage, and including a helix and planar cam surface engageable with said hook for producing the rotational and slidable motions of said hook, wherein said operating lever causes said hook to engage the recording head.

5. A carriage according to claim 4, further comprising an ink jet recording head detachably mountable on said carriage.

6. A carriage according to claim 5, wherein ink is ejected from said ink jet recording head by head produced by an electrothermal transducer.

7. A carriage, movable along a predetermined path, for detachably mounting thereon an ink jet recording head having an integral ink container;

an abutment member disposed at a front portion of said carriage;

a rib provided on said abutment member, wherein said rib projects toward a front of said carriage and beyond a side surface of the recording head from which ink is ejected, said rib extending in a direction of movement of said carriage;

an operating lever disposed substantially entirely adjacent to a side of said carriage substantially perpendicular to a movement direction of said carriage, said operating lever being rotatable in a direction crossing with a plane of movement of said carriage, wherein said operating lever interacts with a portion of said carriage engageable with the recording head; and a shifting mechanism for shifting the rotational motion of said operating lever to the portion of the carriage engageable with the recording head for causing the engageable portion of said carriage to move substantially parallel with the movement direction of said carriage.

8. A carriage according to claim 7, further comprising an ink jet recording head detachably mountable on said carriage.

9. A carriage according to claim 8, wherein ink is ejected from said ink jet recording head by heat produced by an electrothermal transducer.

10. A carriage, movable along a predetermined path, for detachably mounting thereon an ink jet recording head, comprising:

a supporting plate;

a flexible substrate provided along a surface of said supporting plate;

an urging member, disposed between said substrate and the surface of said supporting plate and including a pattern of projections corresponding to electric contacts provided on said substrate;

an operating lever disposed substantially entirely adjacent to a side of said carriage substantially perpendicular to a movement direction of said carriage, said operating lever being rotatable in a direction crossing with a plane of movement of said carriage, wherein said operating lever interacts with a portion of said carriage engageable with the recording head; and a shifting mechanism for shifting the rotational motion of said operating lever to the portion of the carriage engageable with the recording head for causing the engageable portion of said carriage to move substantially parallel with the movement direction of said carriage.

11. A carriage according to claim 10, further comprising an ink jet recording head detachably mountable on said carriage.

12. A carriage according to claim 11, wherein ink is ejected from said ink jet recording head by heat generated by an electrothermal transducer.

13. A carriage according to any one of claims 2, 5, 8 and 11, further comprising as a unit a head element for ejecting ink and an ink container for containing ink supplied to the head element.

14. An ink jet recording apparatus comprising said carriage as defined in claim 1, 4, 7 and 10 and an ink jet recording head detachably mountable on said carriage.

* * * * *

UNITED STATES PATENT AND TRADEMARK OFFICE

CERTIFICATE OF CORRECTION

PATENT NO. : 5,216,448

DATED : June 1, 1993

INVENTOR(S) : YASUHIRO UNOSAWA, ET AL.

It is certified that error appears in the above-identified patent and that said Letters Patent is hereby corrected as shown below:

Title page,
item [75] INVENTORS

"Kazuaki Masuda;" should read
--Kazuaki Masuda, Sagamihara;--.

item [56] REFERENCES CITED

Under FOREIGN PATENT DOCUMENTS: "1-8076 2/1989 Japan" should read --1-8076 1/1989 Japan--.

Drawings:

SHEET 10 OF 30

FIG. 10, "(RECOUERY" should read --(RECOVERY-- and "LOARD" should read --LOAD--.

SHEET 17 OF 30

FIG. 17, "MIDOLE" should read --MIDDLE--; "RECOUERY)" should read --RECOVERY)--; and "(RESET" should read --(RESET)--.

COLUMN 3

Line 27, "head," should read --head-- and "utilized" should read --utilizes--.

COLUMN 5

Line 59, "cover 102, designated" should read --cover 102. Designated--.

UNITED STATES PATENT AND TRADEMARK OFFICE
CERTIFICATE OF CORRECTION

PATENT NO. : 5,216,448

DATED : June 1, 1993

INVENTOR(S) : YASUHIRO UNOSAWA, ET AL.

It is certified that error appears in the above-identified patent and that said Letters Patent is hereby corrected as shown below:

COLUMN 6

Line 33, "a" should be deleted and "is" should read --are--.
Line 34, "is" should read --are--.

COLUMN 8

Line 51 , "is" should read --is a--.

COLUMN 9

Line 47, "bas" should read --base--.

COLUMN 11

Line 25, "spring. 22." should read --spring 22.--.

COLUMN 12

Line 35, "conform" should read --conform to--.
Line 59, "mechanism" should read --mechanism is--.

COLUMN 13

Line 25, "in" should read --is in--.
Line 34, "operation." should read --operation will be described.--.
Line 51, "a" (second occurrence) should be deleted.
Line 67, "is" should read --are--.

UNITED STATES PATENT AND TRADEMARK OFFICE

CERTIFICATE OF CORRECTION

PATENT NO. : 5,216,448

DATED : June 1, 1993

INVENTOR(S) : YASUHIRO UNOSAWA, ET AL.

It is certified that error appears in the above-identified patent and that said Letters Patent is hereby corrected as shown below:

COLUMN 14

Line 47, "tooth" should read --teeth--.
Line 50, "this" should read --these--.

COLUMN 16

Line 21, "an" should read --and--.
Line 43, "contact" should read --contacts--.

COLUMN 20

Line 7, "as envelope is" should read --as an envelope--.
Line 53, "is" should read --from being--.

COLUMN 22

Line 9, "a" should read --as--.
Line 17, "has" should read --have--.

COLUMN 23

Line 49, "urged" should read --urged to the--.

COLUMN 25

Line 21, "a" should be deleted.
Line 48, "operation" should read --operation of--.
Line 66, "which" should be deleted.

UNITED STATES PATENT AND TRADEMARK OFFICE

CERTIFICATE OF CORRECTION

PATENT NO. : 5,216,448

DATED : June 1, 1993

INVENTOR(S) : YASUHIRO UNOSAWA, ET AL.

It is certified that error appears in the above-identified patent and that said Letters Patent is hereby corrected as shown below:

COLUMN 26

Line 33, "with" should read --with a--.
Line 48, "in" should read --in an--.

COLUMN 27

Line 7, "head" (second occurrence) should read --heat--.

Signed and Sealed this

Fifteenth Day of March, 1994

Attest:

Bruce Lehman

BRUCE LEHMAN

*Attesting Officer*

*Commissioner of Patents and Trademarks*